United States Patent
Kizler et al.

(10) Patent No.: US 12,448,023 B2
(45) Date of Patent: Oct. 21, 2025

(54) CAPACITIVE SENSOR DEVICE, STEERING WHEEL COMPRISING A CAPACITIVE SENSOR DEVICE, METHOD FOR OPERATING A CAPACITIVE SENSOR DEVICE AND/OR A STEERING WHEEL, AND VEHICLE COMPRISING A CAPACITIVE SENSOR DEVICE

(71) Applicant: Valeo Schalter und Sensoren GmbH, Bietigheim-Bissingen (DE)

(72) Inventors: Micha Jonathan Kizler, Bietigheim-Bissingen (DE); Georg Poslowsky, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 224 days.

(21) Appl. No.: 18/273,881

(22) PCT Filed: Jan. 18, 2022

(86) PCT No.: PCT/EP2022/050938
§ 371 (c)(1),
(2) Date: Jul. 24, 2023

(87) PCT Pub. No.: WO2022/157127
PCT Pub. Date: Jul. 28, 2022

(65) Prior Publication Data
US 2024/0425098 A1    Dec. 26, 2024

(30) Foreign Application Priority Data
Jan. 25, 2021   (DE) ............ 10 2021 101 455.7

(51) Int. Cl.
| | |
|---|---|
| *B62D 1/04* | (2006.01) |
| *B62D 1/06* | (2006.01) |
| *G01R 5/24* | (2006.01) |

(52) U.S. Cl.
CPC ............ *B62D 1/046* (2013.01); *B62D 1/065* (2013.01); *G01R 5/24* (2013.01)

(58) Field of Classification Search
CPC .......... B62D 1/046; B62D 1/065; G01R 5/24; G01R 27/2605
See application file for complete search history.

(56) References Cited

U.S. PATENT DOCUMENTS

| | | |
|---|---|---|
| 6,650,126 B1 | 11/2003 | Indihar |
| 2013/0328548 A1 | 12/2013 | Hackl |

(Continued)

FOREIGN PATENT DOCUMENTS

| | | |
|---|---|---|
| DE | 102005041823 B3 | 2/2007 |
| DE | 102009000266 A1 | 7/2010 |

(Continued)

OTHER PUBLICATIONS

International Search Report and Written Opinion in corresponding International Application No. PCT/EP2022/050938, dated Apr. 22, 2022 (14 pages).

(Continued)

*Primary Examiner* — Dominic E Hawkins
(74) *Attorney, Agent, or Firm* — Osha Bergman Watanabe & Burton LLP

(57) ABSTRACT

A capacitive sensor device for detecting the presence of a human body part in a detection region of the sensor device is disclosed. The sensor device includes a first sensor electrode with a first electrode section, a second sensor electrode with a second electrode section, and a measuring device for ascertaining a measurement variable, which is based on a current difference between a first current flowing in the first electrode section of the at least one first sensor electrode and a second current flowing in the second electrode section of the second sensor electrode. The measuring (Continued)

Figure 1:
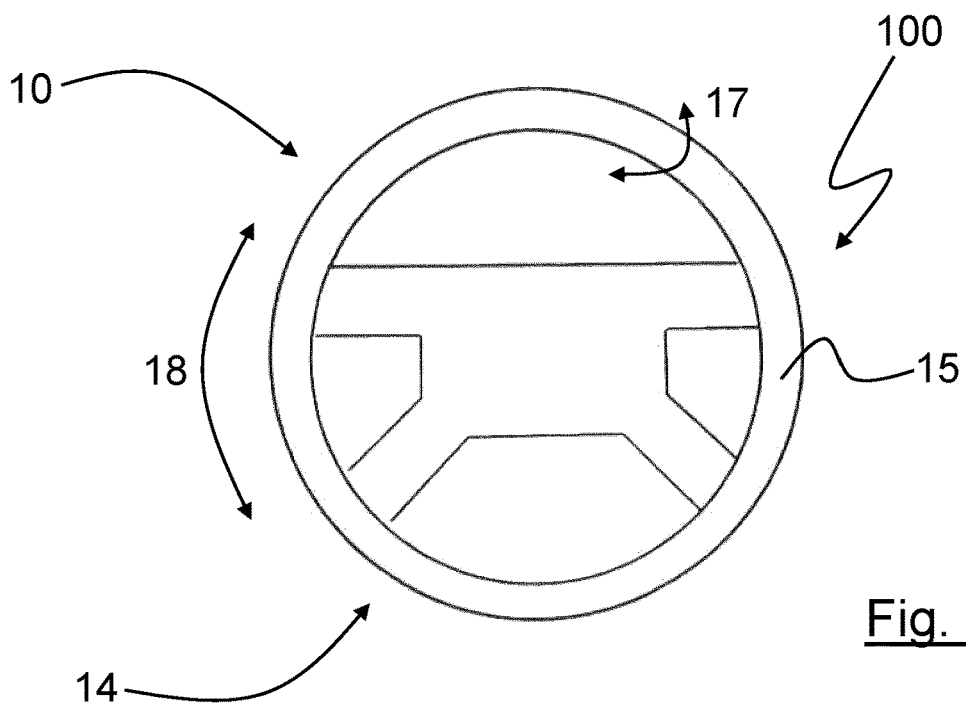

device has an electric coil, and the first electrode section of the first sensor electrode and the second electrode section of the second sensor electrode are at least partly arranged relative to each other and relative to the coil in each case and are coupled to the coil.

16 Claims, 8 Drawing Sheets

(56) References Cited

U.S. PATENT DOCUMENTS

| | | | | |
|---|---|---|---|---|
| 2015/0345998 | A1* | 12/2015 | Lamesch | G01D 5/24 |
| | | | | 324/686 |
| 2017/0129499 | A1* | 5/2017 | Odate | B60W 60/0053 |
| 2019/0185039 | A1* | 6/2019 | Park | B62D 15/029 |
| 2019/0389309 | A1* | 12/2019 | Staude | G06F 3/044 |
| 2020/0290566 | A1* | 9/2020 | Yamazaki | B60R 25/31 |
| 2021/0206418 | A1* | 7/2021 | Nakano | G01V 3/088 |

FOREIGN PATENT DOCUMENTS

| | | |
|---|---|---|
| DE | 112011104407 T5 | 9/2013 |
| DE | 112013006074 T5 | 9/2015 |
| DE | 112014000714 T5 | 10/2015 |
| DE | 102014214160 A1 | 1/2016 |
| DE | 102014117821 A1 | 6/2016 |
| DE | 102014117823 A1 | 6/2016 |
| DE | 102015210618 A1 | 12/2016 |
| DE | 102016224013 A1 | 6/2018 |
| DE | 112017000507 T5 | 12/2018 |
| DE | 102018203609 A1 | 9/2019 |
| DE | 112018000295 T5 | 9/2019 |
| DE | 102019120136 A1 | 1/2021 |
| DE | 102019127579 B3 | 1/2021 |
| EP | 3002176 A1 | 4/2016 |
| FR | 3056291 A1 | 3/2018 |
| WO | 2016050812 A1 | 4/2016 |
| WO | 2019202977 A1 | 10/2019 |
| WO | 2019224177 A1 | 11/2019 |
| WO | 2021005112 A1 | 1/2021 |

OTHER PUBLICATIONS

German Search Report in corresponding German Application No. 10 2021 101 455.7, dated Aug. 5, 2021 (7 pages).

Office Action issued by the Chinese Patent Office for corresponding Chinese patent application No. 202280011340.7, mailed Jul. 30, 2025 (16 pages).

* cited by examiner

CAPACITIVE SENSOR DEVICE, STEERING WHEEL COMPRISING A CAPACITIVE SENSOR DEVICE, METHOD FOR OPERATING A CAPACITIVE SENSOR DEVICE AND/OR A STEERING WHEEL, AND VEHICLE COMPRISING A CAPACITIVE SENSOR DEVICE

The present invention relates to a capacitive sensor device for recognizing the presence of a human body part in a detection region of the sensor device, preferably for a steering wheel, in particular for recognizing the presence of a human hand in a gripping region of a steering wheel, the sensor device comprising at least one first sensor electrode having an associated detection region and a first electrode section and a second sensor electrode having a second electrode section, the at least one first sensor electrode and the second sensor electrode being separated from one another by a dielectric between them and forming a first capacitive element, and the at least one first sensor electrode together with the surroundings furthermore forming a second capacitive element, and the sensor device furthermore comprising a measuring apparatus designed and configured to determine a measurement variable dependent on a current difference between a first current flowing in the first electrode section of the at least one first sensor electrode and a second current flowing in the second electrode section of the second sensor electrode.

Furthermore, the present invention relates to a steering wheel, in particular a steering wheel for a motor vehicle, comprising such a sensor device.

Furthermore, the present invention relates to a method for operating such a sensor device and/or a steering wheel comprising such a sensor device.

Moreover, the present invention relates to a vehicle, in particular comprising such a sensor device.

Capacitive sensor devices of the generic type which are configured, on the basis of a current measurement, to capture a change in a capacitive coupling between a first electrode and a second electrode as a result of a human hand approaching the sensor device are known in principle from the prior art, including for steering wheels or automobile seats, for example from FR 3 056 291, which teaches the measurement of an absolute current flow between the second electrode and ground for this purpose.

Disturbing influences, in particular from outside, for example a changing ambient temperature of the sensor device or a changing air humidity in the surroundings, can result in capacitance changes and thus in a drift, i.e. a systematic deviation, of the current measurement signal.

It is likewise known to determine or to ascertain the change in the capacitive coupling on the basis of a current difference between the currents flowing in the two sensor electrodes, the current difference being determined by firstly measuring each of the individual currents and then determining the sought current difference from them. Determining the current difference enables a drift to be reduced or even completely avoided. However, the measurement of the two individual currents that precedes the determination of the current difference requires a correspondingly comprehensive and complex and thus cost-intensive measuring apparatus.

Against this background, it is an object of the present invention to provide an alternative sensor device, in particular an improved sensor device, which only requires a measuring apparatus of relatively simple construction, but nevertheless has a low tendency toward drift and/or enables simple compensation of disturbing variables.

Furthermore, it is an object of the present invention to provide an alternative, in particular improved, steering wheel comprising a capacitive sensor device, an alternative, in particular improved, method for operating such a capacitive sensor device, and a vehicle comprising an alternative, in particular improved, sensor device.

This object is achieved according to the invention by means of a capacitive sensor device, by means of a steering wheel, by means of a method and by means of a vehicle having the features in accordance with the respective independent patent claims. Advantageous embodiments of the invention are the subject matter of the dependent patent claims, the description and the figures, and will be explained in more detail below. The patent claims are incorporated in the content of the description by express reference.

A capacitive sensor device according to the present invention is designed for recognizing the presence of a human body part in a detection region of the sensor device, preferably for a steering wheel, in particular for recognizing the presence of a human hand in a gripping region of a steering wheel, i.e. in particular for "hands on-off recognition", the sensor device comprising at least one first sensor electrode having an associated detection region and a first electrode section and a second sensor electrode having a second electrode section. In this case, the at least one first sensor electrode and the second sensor electrode are separated from one another by a dielectric between them and form a first capacitive element. The at least one first sensor electrode together with the surroundings furthermore forms a second capacitive element. The sensor device furthermore comprises a measuring apparatus designed and configured to determine a measurement variable dependent on a current difference between a first current flowing in the first electrode section of the at least one first sensor electrode and a second current flowing in the second electrode section of the second sensor electrode.

A capacitive sensor device according to the invention is characterized in that the measuring apparatus comprises an electrical coil having at least one winding, the coil being designed in such a manner and the first electrode section of the first sensor electrode and the second electrode section of the second sensor electrode, at least in sections, being arranged in each case relative to one another in such a manner and in each case relative to the coil in such a manner and being coupled to the coil in such a manner that a measurement variable dependent on a current difference between a first current flowing in the first electrode section and a second current flowing in the second electrode section is generable or is generated in the coil by means of the current difference.

By means of the electrical coil, in a simple manner, it is possible to generate a measurement variable dependent on the current difference between the currents flowing in the sensor electrodes or the electrode sections thereof, in particular a measurement variable proportional to the current difference, which measurement variable can be captured by means of the measuring apparatus, the measuring apparatus comprising for this purpose particularly preferably at least one suitable measuring unit, for example a voltage measuring unit, a current measuring unit and/or a magnetic flux measuring unit.

By virtue of generating a measurement signal dependent on the current difference, it is not necessary for the individual currents to be captured metrologically, nor is there any need for difference formation that is complex in terms of circuitry. As a result, the number of components required for realizing a sensor device according to the invention can be distinctly reduced compared with a configuration with a difference circuit. Furthermore, it is possible to provide a sensor device which in principle (assuming a correspondingly suitable design and configuration) is robust vis-à-vis common-mode interference.

In one advantageous configuration of a sensor device according to the invention, the measuring apparatus can furthermore preferably be designed and configured, particularly preferably additionally, depending on the measurement variable generated and captured, i.e. measured, in the coil, which measurement variable has been generated in particular by means of or depending on a current difference between a first current flowing in the first electrode section and a second current flowing in the second electrode section, to determine and optionally also to output an absolute value of the current difference on which the measurement variable is based.

A sensor device according to the invention is designed in particular for use in a motor vehicle and can be designed for example for use in a steering wheel for so-called "hands on-off detection", or for example for a seat occupancy recognition device, which can recognize whether or not a seat is occupied by a human being. Moreover, many further application possibilities are conceivable.

Particularly preferably, the sensor device is designed here in such a manner that the presence of a human body part in a detection region of the at least one first sensor electrode brings about in each case a capturable change—assigned to the at least one first sensor electrode—in a capacitive coupling of said sensor electrode to the surroundings compared with a reference state without the presence of a human body part in the associated detection region. The change in the capacitive coupling of the first sensor electrode to the surroundings results in a change in the current flow through the capacitive element formed by the first sensor electrode and the second sensor electrode, and thus in the current in the second sensor electrode and hence in turn in the current difference, the change being proportional to the approach, in particular to the distance between the human body part and the first sensor electrode.

In this case, the first sensor electrode and the second sensor electrode are furthermore in particular not in direct electrical contact with one another, but rather are only coupled to one another, and moreover only indirectly, via the dielectric situated between them, the second sensor electrode preferably being almost completely surrounded by the dielectric, in particular completely apart from a connection for making contact with an electrical conductor via which the current can flow away.

In the case of a sensor device according to the invention, the dielectric is chosen here in particular in such a manner that the first capacitive element formed by the first sensor electrode, the dielectric and the second sensor electrode has a defined capacitance, in particular a capacitance in a range of 10 pF to 100 nF.

The first electrode section of the first sensor electrode and/or the second electrode section of the second sensor electrode here can be in particular in each case an electrically conductive connection section of the associated sensor electrode, for example in each case an electrical connection line of the associated sensor electrode. As a result, a particularly simple sensor device which saves installation space, i.e. is space-saving, can be provided which moreover requires no additional components, if appropriate possibly only somewhat longer and differently arranged connection lines.

An "electrical coil" within the meaning of the present invention is an electrical component having at least one electrical conductor in the form of a winding, in particular having an input connection and an output connection, which is wound in such a manner that a magnetic field is generated in the event of a current flow through said conductor, the at least one winding preferably comprising at least one complete turn, in particular a plurality of complete turns, the number of turns particularly preferably being chosen in such a manner and the rest of the winding being designed in particular in such a manner that a resulting inductance of the winding is suitable for capturing the measurement variable dependent on the current difference with sufficient accuracy and for generating a corresponding measurement signal.

In some applications, a suitable inductance for the at least one winding of the coil can be for example an inductance of $L=10$ μH. Alternatively, however, a suitable inductance can be for example also $L=1$ μH, $L=20$ μH, $L=30$ μH, $L=50$ μH, $L=100$ μH or more, for example $L=500$ μH, $L=600$ μH or up to $L=10\,000$ μH, depending on the application. In this case, the suitability of an inductance value is substantially dependent on the properties of the other components of the sensor device, in particular on any possible further inductances, in particular on any possible further inductances coupled to the coil.

In this case, the at least one winding of the electrical coil provided according to the invention in the case of a sensor device according to the present invention can be in particular a measurement winding, i.e. a winding which serves substantially, in particular only, for measuring, i.e. for capturing, the variable which is dependent on the current difference and which is to be determined. The aforementioned at least one winding can alternatively be a winding whose electrical conductor additionally also serves at least one further purpose, for example for feeding an electrical current to an electrode, for example a reference current to the first sensor electrode and/or a heating current to a heating electrode or the like.

In this case, the coil of a sensor device according to the invention or of the measuring apparatus of a sensor device according to the invention can be in principle an air-core coil, i.e. an electrical coil without a coil core, or alternatively can comprise a coil core, in particular a magnetic or magnetizable core, a ferromagnetic core having proved to be particularly advantageous, in particular a permanent magnetic iron core. A coil having a core has the advantage that a stronger measurement signal can be achieved thereby, which has an advantageous effect on the measurement accuracy.

In a further advantageous configuration of a sensor device according to the present invention, the sensor device is furthermore designed and configured in particular to recognize the presence of a human body part in the detection region of the sensor device, in particular the presence of a human hand in the gripping region of a steering wheel, depending on the determined measurement variable, the sensor device comprising in particular an evaluation apparatus for this purpose.

In a further advantageous configuration of a sensor device according to the present invention, the sensor device furthermore comprises a current generating apparatus, in particular at least one of the two sensor electrodes being electrically connectable or connected to the current generating apparatus and being able to have a reference current applied thereto by means of the current generating apparatus, in particular via the associated electrode section of the sensor electrode.

In a further advantageous configuration of a sensor device according to the present invention, the current generating apparatus is an AC current generating apparatus and is designed in particular to generate an AC current as reference current. This makes it possible easily to achieve a required current flow through the first capacitive element from the first sensor electrode into the other, second sensor electrode in order to determine the capacitive coupling or the change in said coupling to the surroundings.

In one particularly advantageous configuration of a capacitive sensor device according to the present invention, in particular the first sensor electrode is electrically connectable or connected to the current generating apparatus and the reference current can be applied to said first sensor electrode, in which case in particular a measurement variable dependent on the current difference between the reference current flowing into the first sensor electrode and the measurement current flowing out of the second sensor electrode can be captured, preferably can be quantitatively measured, by means of the measuring apparatus, and the current difference or an approach and/or touching or indeed no approach or touching can be deduced by means of the evaluation apparatus.

In one particularly advantageous configuration of a capacitive sensor device according to the present invention, the measuring apparatus is furthermore designed and configured in particular to determine a measurement variable dependent on a current difference between a current flowing in the sensor electrode to which the reference current is applied and a measurement current flowing in the other sensor electrode, in particular a measurement variable dependent on a current difference between a reference current flowing in the associated electrode section of the sensor electrode to which the reference current is applied and a measurement current flowing in the associated electrode section of the other sensor electrode.

If the reference current and the measurement current are equal in magnitude or almost equal in magnitude apart from tiny, in particular unavoidable, loss-dictated deviations, it can be assumed that no human body part is situated in the detection region of the sensor device, that is to say that there is in particular no approach and/or touching, since the entire reference current applied to one of the two sensor electrodes, preferably the first sensor electrode, during operation or during a use of the sensor device according to the invention can flow away only via the other of the two sensor electrodes, preferably only via the second sensor electrode, which results in a measurement current of almost equal magnitude.

By contrast, if a human body part is present in the detection region of the sensor device, for example if a human hand approaches and/or touches a steering wheel comprising a sensor device according to the invention, in particular approaches and/or touches the first sensor electrode, the first capacitance formed by the first sensor electrode and the surroundings changes. Furthermore, a capacitance forms between the human body part and the first sensor electrode, via which capacitance reference current, in particular at least a portion thereof, can likewise flow away, like a kind of "fault current" in a so-called residual current circuit-breaker (RCCB). Consequently, there is a decrease in the current flowing away via the other, in particular second, sensor electrode, and thus in the measurement current, which can be captured by the measuring apparatus, the difference between reference current and measurement current increasing when a human body part is present in the detection region of the sensor device.

In this case, the difference between reference current and measurement current is proportional to the distance between the human body part and the sensor electrode, such that in particular the characteristics of the presence (approach, touching, constant position in the detection region, etc.) can be deduced depending on the difference current value.

By evaluating the current difference between the currents flowing in the two sensor electrodes, in particular in the first sensor electrode and the second sensor electrode, in a manner similar to that in the case of a residual current circuit-breaker, in particular by determining a difference between a current flowing into the first sensor electrode and a current flowing away via the second sensor electrode, it is possible for systematic deviations to be eliminated to the greatest possible extent and thus for the negative effects of a systematic deviation to be reduced or even avoided.

This makes it possible for example also to recognize slow release of a steering wheel, which, in the case of a sensor device which is known from the prior art and in which only a current measured in absolute terms serves as a basis for recognizing an approach and/or touching, cannot be differentiated from a temperature-dictated, systematic deviation, i.e. from a temperature-dictated drift of the current measurement value.

By this means, in a sensor device according to the invention, in many cases it is possible to dispense with a shielding element, in particular a thermal shielding element, by means of which a temperature-dictated drift can be reduced, in particular a temperature-dictated change in capacitance between the first sensor electrode and the second sensor electrode, on which the magnitude of the current flowing away via the second sensor electrode is directly dependent. Consequently, a sensor device according to the invention makes it possible to provide a simpler, lighter and generally also more cost-effective sensor device, in particular to provide a simpler, lighter and in many cases also more cost-effective steering wheel comprising a capacitive sensor device.

Furthermore, with a sensor device according to the invention, in many cases it is easily possible to recognize a systematic deviation, in particular a temperature drift, namely by a comparison of both current measurement values with earlier, i.e. temporally preceding, current measurement values and/or one or more associated reference values. If for example both current measurement values in principle are each higher than at the beginning of a respective measurement series or higher than associated reference current measurement values, there is a high probability of a systematic deviation being present, for example a temperature drift owing to heating of the sensor electrodes by insolation.

In a further and particularly advantageous configuration of a sensor device according to the present invention, the evaluation apparatus is preferably configured to recognize the presence of a human body part in the detection region of the sensor device, in particular the presence of a human hand in the gripping region of a steering wheel, depending on the current difference between reference current and measurement current, in particular depending on the determined measurement variable, the sensor device, in particular the evaluation apparatus, being configured to recognize whether or not a human body part is present in the detection region of the sensor device (yes/no). A so-called "hands on-off detection" can be realized in an advantageous manner as a result. A sensor device according to the invention enables a particularly accurate "hands on-off detection" on account of the reduction or elimination of some systematic deviations that typically occur during the operation of a capacitive sensor device.

Particularly preferably, the evaluation apparatus of a sensor device according to the invention is furthermore configured to specify whether there is in each case an approach or touching or a positionally invariable presence of the human body part in the detection region.

In a further possible and particularly advantageous configuration of a sensor device according to the present invention, the evaluation apparatus is configured, in particular if the presence of a body part in the detection region has been recognized, to ascertain, depending on the determined measurement variable and the current difference between reference current and measurement current that forms the basis for said measurement variable, a variable that is characteristic of the presence of a human body part in the detection region of the associated sensor electrode, preferably a variable that characterizes an approach and/or touching, in particular a variable that characterizes a human hand approaching a gripping region of a steering wheel and/or a human hand touching the gripping region of a steering wheel, for example a distance and/or a position of the body part.

In this case, the evaluation apparatus is particularly preferably configured in particular to ascertain, depending on the determined measurement variable, a distance between a human body part and the at least one first sensor electrode and/or a defined reference basis, in particular the distance between a human hand and a gripping region of a steering wheel. For this purpose, the sensor device is preferably designed in such a manner that the measurement variable is proportional to a distance between the human body part and the sensor device, in particular the at least one first sensor electrode.

In one development of a sensor device according to the present invention, the first electrode section and the second electrode section are designed in particular in such a manner and arranged relative to one another in such a manner that a current flowing in the first electrode section and a current flowing in the second electrode section flow in opposite directions at least in the region of the coil and/or generate in each case oppositely directed magnetic fluxes in the coil, in particular in such a manner that in a reference state of the coil, the current flowing in the first electrode section and the current flowing in the second electrode section, at least in a region of influence on the coil, cancel one another out at least partly, in particular completely, and/or the oppositely directed magnetic fluxes respectively generated in the coil cancel one another out at least partly, in particular completely. This makes it possible for systematic deviations, in particular systematic deviations caused by the reference current, to be eliminated to the greatest possible extent and thus for the negative effects of a systematic deviation to be reduced or even avoided.

Within the meaning of the present invention, "reference state" is understood to mean in particular a state in which there is no capacitively effective input means in the detection region of the sensor device.

In one possible and advantageous configuration of a sensor device according to the present invention, the measurement variable that is dependent on the current difference and is generable or generated in the coil is an electrical voltage, in particular an electrical voltage that is generable in the at least one winding of the coil, and the measuring apparatus comprises a voltage measuring unit for measuring said electrical voltage. This makes possible a particularly simple and thus cost-effective construction of the measuring apparatus and thus makes it possible to provide a particularly simple and cost-effective sensor device.

For this purpose, it has proved to be particularly advantageous if the coil is designed in particular in such a manner and the first electrode section of the first sensor electrode and the second electrode section of the second sensor electrode, at least in sections, are arranged in each case relative to one another in such a manner and are arranged in each case relative to the coil in such a manner that, by means of a current difference between a first current flowing in the first electrode section and a second current flowing in the second electrode section, an electrical voltage dependent on the current difference, in particular an electrical voltage proportional to the current difference, is generable or is generated in the coil, in particular in the at least one winding of the coil, the measurement variable dependent on the current difference being in particular a voltage dropped across the at least one winding of the electrical coil or an associated voltage drop.

A particularly simple and advantageous configuration of a measuring apparatus for this purpose arises if the coil, in particular the at least one winding of the coil, comprises a first connection contact and a second connection contact, the electrical voltage that is generable or is generated in the coil or the at least one winding thereof by means of the current difference between the first current flowing in the first electrode section and the second current flowing in the second electrode section being generable or being generated between the first connection contact and the second connection contact of the coil.

For capturing the voltage in the at least one winding of the coil, in particular the voltage dropped across the winding, the sensor device, in particular the measuring apparatus, preferably comprises a voltage measuring unit, in particular a voltage measuring unit for measuring an electrical voltage generated or dropped between the first connection contact and the second connection contact of the coil.

Particularly preferably, the measuring apparatus is furthermore designed and configured, depending on the measured electrical voltage that has been generated in the coil, in particular by means of a current difference between a first current flowing in the first electrode section and a second current flowing in the second electrode section, to determine the current difference on which said electrical voltage is based.

In one particularly advantageous configuration of a sensor device according to the present invention, for this purpose the first electrode section and/or the second electrode section are/is situated at least partly within the coil, i.e. in a space within the coil, or are/is arranged at least partly in the interior of the coil.

By way of example, the first electrode section and/or the second electrode section, at least in sections, can run within the coil or, at least in sections, can be guided in the interior through the coil and/or can cross the interior of the coil.

Depending on the geometry of the coil, the first electrode section and/or the second electrode section in this case, at least in sections, can run next to the turns, in particular parallel thereto, or within the turns of the at least one winding.

In this case, the electrical coil of a sensor device according to the invention for example can be a toroidal coil and can be wound almost in closed fashion in the circumferential direction or else can extend only over part of the circumference.

Alternatively, the coil can also be a right cylindrical coil or a cuboidal coil, i.e. a coil having a cylindrical outer contour of the winding or having a cuboidal base of the winding, i.e. a rectangular or square base of the winding. In this case, the at least one winding can run in the shape of a frame, in particular along a quadrilateral frame, for example, and can be designed to be open or closed in the "circumferential direction" of the frame (i.e. over the complete circumference of the frame). In principle, however, other geometries are also conceivable.

In the case of an annular coil, a so-called toroidal coil, for example, the first electrode section and/or the second electrode section, at least in sections, can run parallel to or along a geometric center axis or path of the at least one winding, i.e. parallel to or along an axis or path running along a geometric center of the at least of the coil. If the coil is an annular coil, for example, and the center of the annulus forms the geometric center, the first electrode section and/or the second electrode section, at least in sections, can extend in particular along or parallel to an axis which intersects the geometric center of the coil and is perpendicular to an annulus plane in which the coil extends, in a similar manner to a so-called Rogowski coil that is known in principle from the prior art.

If a current flows through the electrode sections of the sensor electrodes, a magnetic flux arises in the coil and in turn causes a voltage or a current to be generated in the at least one winding of the coil, the generated voltage or the generated current being dependent on the current difference in the electrode sections.

In one possible configuration, in particular if the coil is an air-core coil, the first electrode section and/or the second electrode section, at least in sections, can alternatively also be guided in the interior of the at least one winding, i.e. in the interior of the turns, in particular along or parallel to a turns center axis. However, this is more complicated in terms of production since arranging the electrode sections accordingly is more complex.

If the coil is a straight coil, for example, the first electrode section and/or the second electrode section can be guided in particular in the interior of the turns along the longitudinal axis in the coil (provided that the coil is an air-core coil).

An annular coil has the advantage that if the electrode sections are arranged in the geometric center or near to that or parallel to the geometric center axis, a distance of the winding, in particular a mean distance of the winding, is almost constant with respect to the electrode sections, in contrast for example to a coil shaped like a rectangular frame. Furthermore, in an annular coil, irrespective of whether or not there is a core, it is possible to generate a more uniform magnetic flux and hence a more uniform measurement variable. On account of that, therefore, in many cases with an annular coil it is possible to achieve a higher signal quality of the measurement signal or of the measurement variable and thus a higher measurement accuracy. Therefore, a toroidal coil is particularly advantageous.

In a further possible and advantageous configuration of a sensor device according to the present invention, the measurement variable that is dependent on the current difference and is generable or generated in the coil is an electrical current, in particular a current flowing in the at least one winding of the coil, the measuring apparatus preferably comprising a current measuring unit for measuring said electrical current.

For this purpose, it has proved to be particularly advantageous if the coil is designed in particular in such a manner and the first electrode section of the first sensor electrode and the second electrode section of the second sensor electrode, at least in sections, are arranged in each case relative to one another in such a manner and are arranged in each case relative to the coil in such a manner and are coupled to the coil in such a manner that, by means of a current difference between a first current flowing in the first electrode section and a second current flowing in the second electrode section, an electrical current dependent on the current difference, in particular an electrical current proportional to the current difference, is generable or is generated in the coil, in particular in the at least one winding of the coil.

A particularly simple and advantageous configuration of a measuring apparatus for this purpose arises if the coil, in particular the at least one winding of the coil, comprises a first connection contact and a second connection contact, the electrical current that is generable or is generated in the coil or in the at least one winding by means of the current difference flowing between the first connection contact and the second connection contact in the coil.

For capturing the current in the at least one winding of the coil, the sensor device, in particular the measuring apparatus, preferably comprises a current measuring unit, in particular a current measuring unit for measuring a current flowing between the first connection contact and the second connection contact in the coil.

Particularly preferably, the measuring apparatus is furthermore designed and configured, depending on the measured electrical current flowing in the coil, in particular in the at least one turn, furthermore to determine the absolute current difference on which this is based. This allows further evaluations and the implementation of further functions.

In this case, an electrical current as measurement variable can be captured in principle as an alternative or in addition to an electrical voltage as measurement variable. Additional capture enables plausibilization in a simple manner, as a result of which a higher functional reliability can be ensured. Depending on the configuration of the sensor device, this can be achieved in particular with the aid of just a further measuring unit and in particular without further additional components in the region of the coil.

For capturing an electrical voltage and an electrical current as measurement variable, it has proved to be particularly advantageous if the at least one winding of the coil is a measurement winding, in which case in particular a voltage which is dropped across the measurement winding and which has been generated depending on the current difference can be captured by way of a corresponding voltage measuring unit, and an electrical current flowing in the measurement winding can be captured by way of a corresponding current measuring unit.

If a current flows through the windings formed by the electrode sections, a magnetic flux arises in the coil and in turn causes a voltage or a current to be generated in the measurement winding, the generated voltage or the generated current being dependent on the current difference in the electrode sections.

What is particularly advantageous is a configuration of the electrical coil in which the at least one winding of the coil is a measurement winding and the first electrode section and the second electrode section in each case form a further winding of the coil, the individual windings being coupled to one another, in particular magnetically, in particular via a common coil core. This enables an advantageous sensor device according to the invention to be provided in a particularly simple manner.

Particularly preferably, the first electrode section and the second electrode section in each case form a further winding having in each case a plurality of turns, the electrode sections or the turns formed therefrom being arranged in particular in such a manner that the currents or the magnetic fluxes generated in the coil by the currents flowing in the electrode sections cancel one another out, at least in a reference state of the sensor device. This enables systematic influences on the measurement variable that are caused by the currents flowing in the electrode sections to be reduced or even completely eliminated, which has an advantageous effect on the measurement accuracy and the robustness of the sensor device.

One particularly advantageous configuration for such a sensor device can be achieved in particular with an annular coil with a magnetic or magnetizable core, in particular with a ferromagnetic core, i.e. with a toroidal coil, preferably comprising a ring-shaped, permanent-magnetic, ferromagnetic core. The individual windings or their turns, i.e. the measurement winding and the further windings formed by the electrode sections, here are particularly preferably wound in each case around this core, i.e. around the same core.

Owing to the currents flowing in the electrode sections, in particular owing to the resulting current difference given a corresponding arrangement of the windings, a magnetic flux dependent on the current difference is generated in the coil core and in turn leads to a current dependent on the current difference or a voltage dependent on the current difference in the measurement winding and can be captured as measurement variable.

Alternatively, the electrode sections, in each case at least in sections, can also form further windings of a further coil, in particular of a secondary coil, which however (in a manner similar to that in the case of a transformer) is coupled to the coil with the measurement winding (primary coil) via a common magnetic or magnetizable core, in particular a common ferromagnetic core, such that an electrical current or an electrical voltage is generated via the in the core depending on the current difference in the electrode sections in the measurement winding and can be captured as measurement variable.

The number of turns of the further windings is chosen in relation to the number of turns of the measurement winding here in particular in such a manner that a sufficiently accurate measurement is possible, in particular a sufficiently strong measurement signal is generated for reliable and accurate capture of the measurement variable. What matters here ultimately is in particular the ratio of the absolute inductances of the individual windings relative to one another.

In some cases, it is advantageous for example if the measurement winding and the further windings formed by the two electrode sections have in each case approximately the same inductance, for example in each case an inductance of in each case approximately $L=10$ µH. Alternatively, however, a suitable inductance can be for example also $L=20$ µH, $L=30$ µH, $L=50$ µH, $L=100$ µH or more, for example $L=500$ µH, $L=600$ µH or up to $L=1000$ µH, depending on the application.

In a further possible and advantageous configuration of a sensor device according to the present invention, the measurement variable that is dependent on the current difference and is generable or generated in the coil can also be a magnetic flux, in particular a magnetic flux flowing in the coil, in particular a magnetic flux flowing in a core of the coil, the measuring apparatus in this case comprising in particular a magnetic flux measuring unit for measuring said magnetic flux, for example at least one Hall sensor. This configuration requires particularly few windings and is therefore particularly advantageous with regard to the number of component parts required.

In this case, a magnetic flux as measurement variable can be captured in principle as an alternative or in addition to an electrical voltage and/or an electrical current as measurement variable. Additional capture enables plausibilization in a simple manner, as a result of which a higher functional reliability can be ensured. Depending on the configuration of the sensor device, this can be achieved in particular with the aid of just a further measuring unit, for example a simple Hall sensor, and in particular without further additional components in the region of the coil.

In some cases, it can be advantageous, irrespective of whether the captured measurement variable is a voltage, a current and/or a magnetic flux, if the measuring apparatus furthermore comprises a measurement signal amplifying apparatus, for example a corresponding amplifier circuit, in order to enable a sufficiently accurate evaluation. In many cases, simple signal amplification can already be sufficient.

For capturing a magnetic flux as measurement variable by means of the coil or in the coil, it has proved to be particularly advantageous if the coil comprises at least one first winding, a second winding and a magnetic or magnetizable core, in particular a ferromagnetic core, the first winding being formed by the first electrode section, and the second winding being formed by the second electrode section. An additional measurement winding is not absolutely necessary. The magnetic flux generated in the core depending on the current difference can be directly tapped off or captured with the aid of a Hall sensor element, for example.

A particularly simple configuration for such a sensor device can be achieved for example with an annular coil with a ring-shaped, but not completely closed, magnetic ring core having a small air gap between its ring ends, a Hall sensor element projecting into said air gap in order to capture a resulting magnetic flux flowing through the gap in the circumferential direction.

In a further, in particular particularly advantageous, possible configuration of a sensor device according to the present invention, the sensor device can comprise in particular a plurality of first sensor electrodes each having an associated detection region, as described for example in DE 102019120136.5, in which case the plurality of first sensor electrodes can each be electrically insulated from one another and be arranged or arrangeable in a manner distributed over a detection area of the sensor device, for example distributed over at least part of a gripping region of a steering wheel or distributed over the entire gripping area of a steering wheel, and in particular are each able to have a defined reference current applied thereto, each first sensor electrode preferably being assigned to one or more sectors, and the sensor device being configured in particular to recognize the presence of a human body part in each case sector by sector, in particular an approach and/or touching by a human hand sector by sector, the sensor device particularly preferably being configured, if the presence of a human body part has been recognized in at least one sector, to determine therefrom in particular a position of said human body part. By this means, in a particularly simple manner, in particular with few additional components, it is possible to realize a position determination which makes it possible to realize comprehensive functions, for example comprehensive driver assistance functions in a vehicle.

If a plurality of first sensor electrodes are provided and if the sensor device is configured for recognizing the presence of a human body part in each case sector by sector, a position of a human body part situated in the detection region of the sensor electrodes can be determined in particular from the ratio of the captured changes—assigned to the individual sensor electrodes from among the plurality of first sensor electrodes—in the capacitive couplings to the surroundings or from the current differences respectively resulting therefrom and the measurement variables dependent on said current differences. A corresponding spatial resolution is possible depending on the subdivision and arrangement of the individual sensor electrodes. For this purpose, particularly preferably, in each case at least two of the first sensor electrodes are arranged in a manner intermeshing with one another, in particular as described in DE 10 2014 117 823 or DE 10 2014 117 821, to which explicit reference is hereby made for advantageous sensor electrode structures for this purpose.

Moreover, one or more second sensor electrodes can also be provided, as described for example likewise in DE 102019120136.5, to which explicit reference is hereby made for advantageous sensor electrode structures for this purpose.

With the aid of a plurality of first and/or second sensor electrodes, it is possible to determine not only a position of a human body part in the detection region of the sensor device, but also for example nonuniform heating of the sensor device that arises as a result of nonuniform insolation, and a resultant systematic deviation distributed nonuniformly as a consequence of that, which generally cannot be recognized and hence cannot be compensated for by a customary, and in particular single, temperature sensor. Consequently, the recognition accuracy can be improved even further by a sensor device according to the invention having such a configuration having a plurality of first and/or second sensor electrodes.

In a further, in particular particularly advantageous configuration of a sensor device according to the present invention, the sensor device, in particular the evaluation apparatus, is furthermore configured to compensate for at least one disturbing variable computationally, in particular at least one disturbing variable arising as a result of a parasitic capacitance, the parasitic capacitance in particular being small in relation to a change in capacitance in the event of the presence of, in particular an approach and/or touching by, a human body part in the detection region, and/or a disturbing variable based on a temperature-dictated systematic deviation.

In a further advantageous configuration of a sensor device according to the present invention, the sensor device, in particular the current generating apparatus and/or the measuring apparatus and/or the evaluation apparatus, comprises one or more circuits, in particular discrete circuits and/or switching elements, for example one or more operational amplifiers and/or one or more filter apparatuses (low-pass, high-pass, bandpass) and/or one or more resistors, at least one circuit preferably being an integrated circuit (IC), in particular an application-specific integrated circuit (ASIC), an ASIC appearing to be particularly advantageous: firstly owing to the low currents to be expected and secondly owing to an achievable compact configuration requiring extremely little space.

In a further, in particular particularly advantageous configuration of a sensor device according to the present invention, the sensor device is configured to output at least one sensor signal containing signal information that characterizes the presence of a human body part in the detection region of the sensor device, preferably an approach and/or touching, in particular a human hand touching and/or approaching a gripping region of a steering wheel, for example a sensor signal having signal information as to whether a human body part is situated in the detection region of the sensor device, and if there is, preferably where in the detection region and/or in particular at what distance from a gripping area, and/or whether said body part is approaching or moving away or touching a gripping area. This makes it possible to realize particularly advantageous and comprehensive functions, for example comprehensive driver assistance functions.

A steering wheel according to the invention comprising a capacitive sensor device, in particular for a vehicle, is characterized in that it comprises a sensor device designed according to the present invention. With a sensor device according to the invention, it is possible to realize particularly advantageously a "hands on-off detection", in particular in a particularly simple manner and particularly accurately.

In one particularly advantageous configuration of a steering wheel according to the present invention, the steering wheel here comprises a metallic, electrically conductive steering wheel rim core designed to extend circumferentially around an axis of rotation of the steering wheel, the steering wheel rim core at least partly, in particular completely, forming the second sensor electrode. This results in a steering wheel configuration which is particularly compact and requires few parts, since as a rule every steering wheel generally has a corresponding steering wheel rim core.

Instead of the steering wheel rim core being at least partly used as second sensor electrode, as an alternative or in addition to a steering wheel rim core, it is also possible to provide at least one further electrode that is used as second sensor electrode.

For an optimum function of the sensor device, if the steering wheel rim core is used as second sensor electrode, said core in this case is almost completely surrounded by a dielectric, in particular completely apart from a connection for making contact with an electrical conductor via which a (measurement) current can flow away. In this case, upstream of a tapping-off point at which a current flowing away from the second sensor electrode is tapped off for capturing the measurement variable dependent on the current difference, the steering wheel rim core is in particular not contacted elsewhere than via the aforementioned one conductor via which the current can flow away, and/or is connected to ground. That is to say, in other words, that the steering wheel rim core or a respective second sensor electrode should not be contacted elsewhere upstream of said tapping-off point in the current flow direction, for example with vehicle ground (GND or 0 V), in particular the ground terminal of the vehicle battery, in order to ensure a correct (measurement) current.

Particularly preferably, the steering wheel furthermore additionally comprises an, in particular closed, outer covering, preferably composed of leather and/or composed of plastic, preferably having a gripping area extending in particular over almost the entire covering. In this case, the detection region can extend over the entire gripping area of the steering wheel or only over part of the gripping area.

In a further advantageous configuration of a steering wheel according to the present invention, the at least one first sensor electrode is preferably arranged in a radial direction between an outer covering of the steering wheel and the dielectric, in which case, if the steering wheel comprises a plurality of first sensor electrodes, preferably all of the first sensor electrodes are arranged in each case between an outer covering of the steering wheel and the dielectric. Particularly good recognition can be achieved by this means.

In a further advantageous configuration of a steering wheel according to the present invention, the steering wheel comprises at least one heating electrode, in particular a heating mat, at least one first sensor electrode being formed at least partly or completely by at least one heating electrode. This results in a steering wheel configuration which is particularly compact and requires few parts, since as a rule every steering wheel generally has a corresponding steering wheel rim core.

Instead of one or more heating electrodes being at least partly used as one or more first sensor electrodes, as an alternative or in addition to one or more first sensor electrodes, it is also possible to provide at least one further electrode that is used only as heating electrode.

In one particularly advantageous configuration of a steering wheel according to the present invention, the at least one heating electrode here comprises two connection heating electrode sections, in particular a first connection heating electrode section and a second connection heating electrode section, and the two connection heating electrode sections are designed in particular in each case in such a manner and are arranged in each case relative to one another in such a manner and in each case relative to the coil in such a manner and are coupled to the coil in such a manner that a heating current flowing in the first connection heating electrode section and a heating current flowing in the second connection heating electrode section flow in opposite directions at least in the region of the coil and/or generate in each case oppositely directed magnetic fluxes, such that an influence, resulting from the heating current, on the measurement variable that is generable or generated in the coil depending on the current difference in the electrode sections of the sensor electrodes is reduced or avoided, in particular in such a manner that during the heating of the coil, the current flowing in the first connection heating electrode section and the current flowing in the second connection heating electrode section, at least in a reference state of the sensor device, in a region of influence on the coil, cancel one another out at least partly, preferably completely. This makes it possible for systematic deviations, in particular systematic deviations caused by the heating current, to be eliminated to the greatest possible extent and thus for the negative effects of a systematic deviation to be reduced or even avoided.

In this case, the connection heating electrode sections can run in particular in the manner as described above for the electrode sections. Particularly preferably, however, the connection heating electrode sections here are guided in each case similarly or identically to the first and/or second electrode sections. If the electrode sections run along a geometric center axis, for example, the connection heating electrode sections preferably likewise run along or parallel to this axis.

By contrast, if the first electrode section and the second electrode section form a further winding of the coil, for example, the connection heating electrode sections particularly preferably likewise form further windings of the coil or windings of a further coil (secondary coil), which is magnetically coupled to the measurement coil (primary coil) via a common coil core.

The number of turns of the connection heating electrode sections here is particularly preferably chosen in each case in relation to the number of turns of the measurement winding and/or to the number of turns of the further windings formed by the electrode sections in such a manner that a sufficiently accurate measurement is possible, in particular a sufficiently strong measurement signal of the measurement variable is generated, at least one measurement signal that can be processed further sufficiently accurately after amplification.

A ratio of an inductance of a winding formed by a connection heating electrode section to an inductance of the measurement winding and/or an inductance formed by an electrode section of at least 10:1, in particular of at least 50:1, for example of 60:1, in particular of up to 100:1, appears to be advantageous, with preference the inductances formed by the windings of the two connection heating electrode sections being preferably approximately equal, in particular in such a manner that in a reference state, during heating operation, the magnetic fluxes generated by the heating currents in the coil, in particular in the coil core, cancel one another out.

In the case, too, of a steering wheel according to the invention, the first sensor electrode can be formed at least partly or completely by a heating electrode, in which case a connection heating electrode section of the heating electrode can form the electrode section of the first sensor electrode.

However, the connection heating electrode sections can also be designed to be separate from the electrode sections. This has the advantage that under certain preconditions, assuming a suitable configuration of the sensor device, at the same time, i.e. during a heating cycle, a capacitive coupling can be determined, in particular the measurement variable can be captured.

In a further advantageous configuration of a steering wheel according to the present invention, the sensor device can comprise a plurality of first sensor electrodes, as likewise described for example in DE 102019120136.5, to which explicit reference is made in this regard, too.

In one particularly advantageous configuration of a steering wheel according to the present invention, the sensor device can also be configured in particular for ascertaining an enclosing angle of a hand on the steering wheel and/or for ascertaining a hand position on a steering wheel in the circumferential direction, for example as described in DE 10 2014 117 823 or DE 10 2014 117 821, which have already been repeatedly cited and to which likewise explicit reference is hereby made for more detailed explanations in this regard.

A method according to the invention for operating a sensor device according to the invention and/or for operating a steering wheel according to the invention, in particular for recognizing the presence of a human body part in a detection region of the sensor device and/or of the steering wheel, in particular for recognizing a human hand approaching and/or touching the sensor device and/or the steering wheel, is characterized by the following steps:

providing the sensor device, and
    determining, with the aid of the coil of the measuring apparatus of the sensor device, a measurement variable dependent on a current difference between a first current flowing in the first electrode section of the at least one first sensor electrode and a second current flowing in the second electrode section of the second sensor electrode.

The method according to the invention makes it possible to achieve a high recognition accuracy in a particularly simple manner, in particular with considerably smaller negative effects on account of systematic deviations arising during the use of the sensor device.

The coil here is designed in such a manner and the first electrode section of the first sensor electrode and the second electrode section of the second sensor electrode, at least in sections, here are arranged in each case relative to one another in such a manner and are coupled in each case relative to the coil and to the coil in such a manner that, by means of a current difference between a first current flowing in the first electrode section and a second current flowing in the second electrode section, a measurement variable dependent on the current difference, in particular a measurement variable proportional to the current difference, is generated in the coil.

In one preferred embodiment of a method according to the invention, in this case in particular before and/or during the determination of the measurement variable, a reference current is applied to at least one first sensor electrode or an associated second sensor electrode, in particular in such a manner that a current difference arises between the reference current flowing in one sensor electrode, in particular the electrode section thereof, and a measurement current flowing in the other sensor electrode, in particular in the electrode section thereof, and a measurement variable dependent on this current difference is generated.

For the purpose of generating the reference current, in particular an AC voltage is applied to a sensor electrode pair comprising a first sensor electrode and an associated second sensor electrode, in particular with the aid of a corresponding current generating apparatus.

In one advantageous embodiment of a method according to the present invention, preferably in at least one further step, the determined measurement variable is taken as a basis for checking whether a human body part is situated in the detection region of the sensor device, in particular in the detection region of the first sensor electrode, a human body part being situated in the detection region of the sensor device, in particular in the detection region of the associated first sensor electrode, if the current difference on which the determined measurement variable is dependent is different, in particular significantly different, than zero, and/or an absolute value of the measurement variable exceeds a defined threshold value, and no human body part being situated in the detection region if the current difference is zero or almost zero, i.e. the reference current and the measurement current are equal within the scope of the measurement accuracy, and/or an absolute value of the determined measurement variable lies below a defined threshold value. An evaluation which is particularly simple and thus requires few resources can be realized by this means.

In a further advantageous embodiment of a method according to the present invention, in particular, preferably in at least one further step, depending on the determined measurement variable, a variable that is characteristic of the presence of a human body part in the detection region of the associated sensor electrode is ascertained, preferably a variable that characterizes an approach and/or touching, in particular a variable that characterizes a human hand approaching a gripping region of a steering wheel and/or a human hand touching the gripping region of a steering wheel.

In a further advantageous embodiment of a method according to the present invention, in this case, preferably, provided that the sensor device is correspondingly configured for this purpose, the measurement variable is ascertained sector by sector and in particular in a further step, provided that the presence of a body part in the detection region of the sensor device has been recognized, a position of the body part in the detection region is determined therefrom. This makes it possible to realize particularly advantageous further functions, for example comprehensive driver assistance functions.

In a further advantageous embodiment of a method according to the present invention, in particular, preferably in at least one further step, provided that the sensor device is correspondingly configured for this purpose, at least one compensation variable is ascertained and at least one determined characterizing variable is computed with the at least one determined compensation variable for the purpose of the at least partial compensation of at least one disturbing variable. This makes it possible to realize a particularly accurate identification.

In a further advantageous embodiment of a method according to the present invention, in particular, preferably in at least one further step, provided that the sensor device is correspondingly configured for this purpose, at least one further step involves generating and outputting at least one sensor signal containing signal information that characterizes the presence of a human body part in the detection region of the sensor device, in particular a human hand touching and/or approaching, preferably a gripping region of a steering wheel. This makes it possible to realize particularly advantageous further functions, for example comprehensive driver assistance functions.

In a further advantageous embodiment of a method according to the present invention, the measurement variable is determined during the operation of the heating apparatus, in particular while a heating current is applied to the heating electrode, in particular the connection heating electrode sections thereof. This results in a particularly advantageous functionality of a steering wheel according to the invention.

A vehicle according to the invention is characterized in that it comprises a sensor device according to the invention and/or a steering wheel according to the invention and/or is designed for carrying out a method according to the invention.

The preferred embodiments presented with reference to a sensor device according to the invention, and their advantages, correspondingly also apply to a steering wheel according to the invention, and to a method according to the invention and to a method according to the invention.

Further features of the invention are evident from the claims, the figures, and the description of the figures. All the features and combinations of features that are mentioned in the description above, and also the features and combinations of features that are mentioned in the description of the figures below and/or are shown in the figures alone, can be used not only in the respectively indicated combination but also in other combinations or else on their own, provided that this is in each case technically possible in principle, i.e. implementable.

The invention will now be explained in more detail on the basis of a plurality of, non-limiting, preferred exemplary embodiments and with reference to the accompanying drawings.

Figure 2:
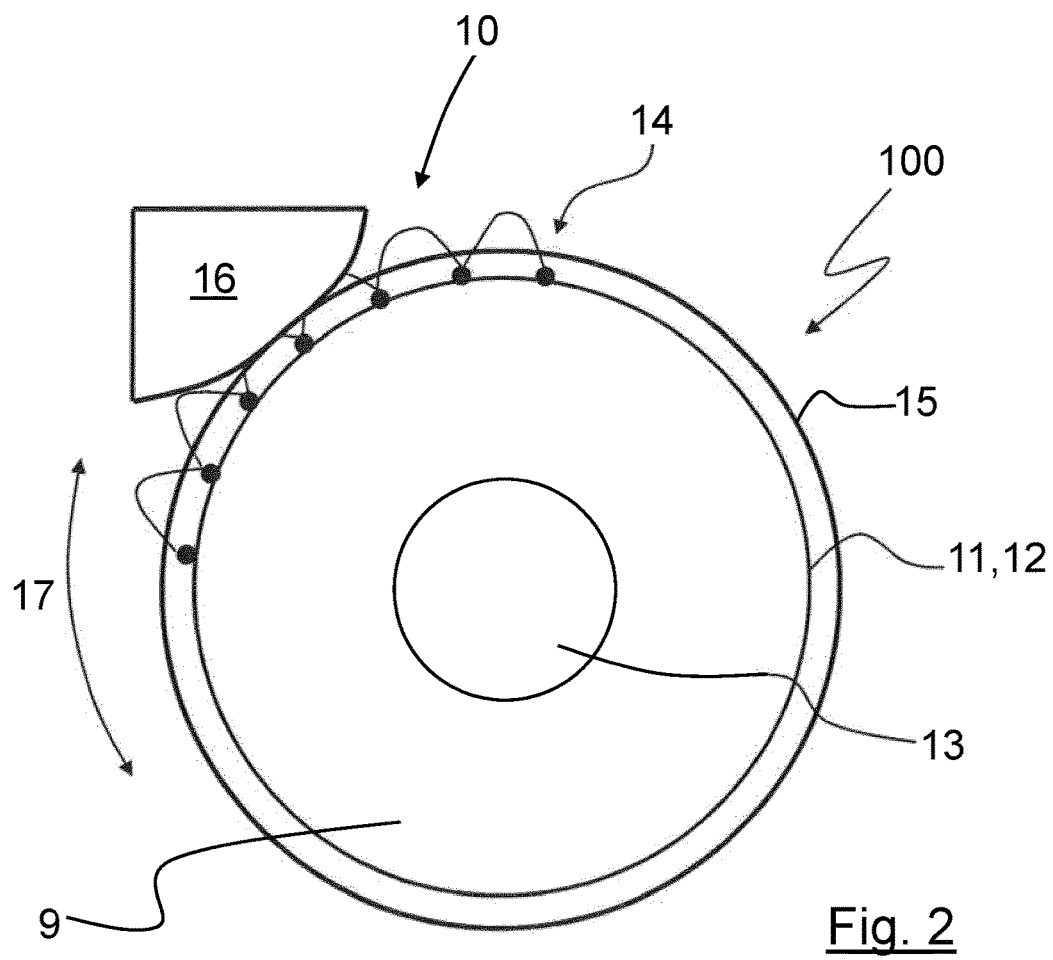
Figure 3:
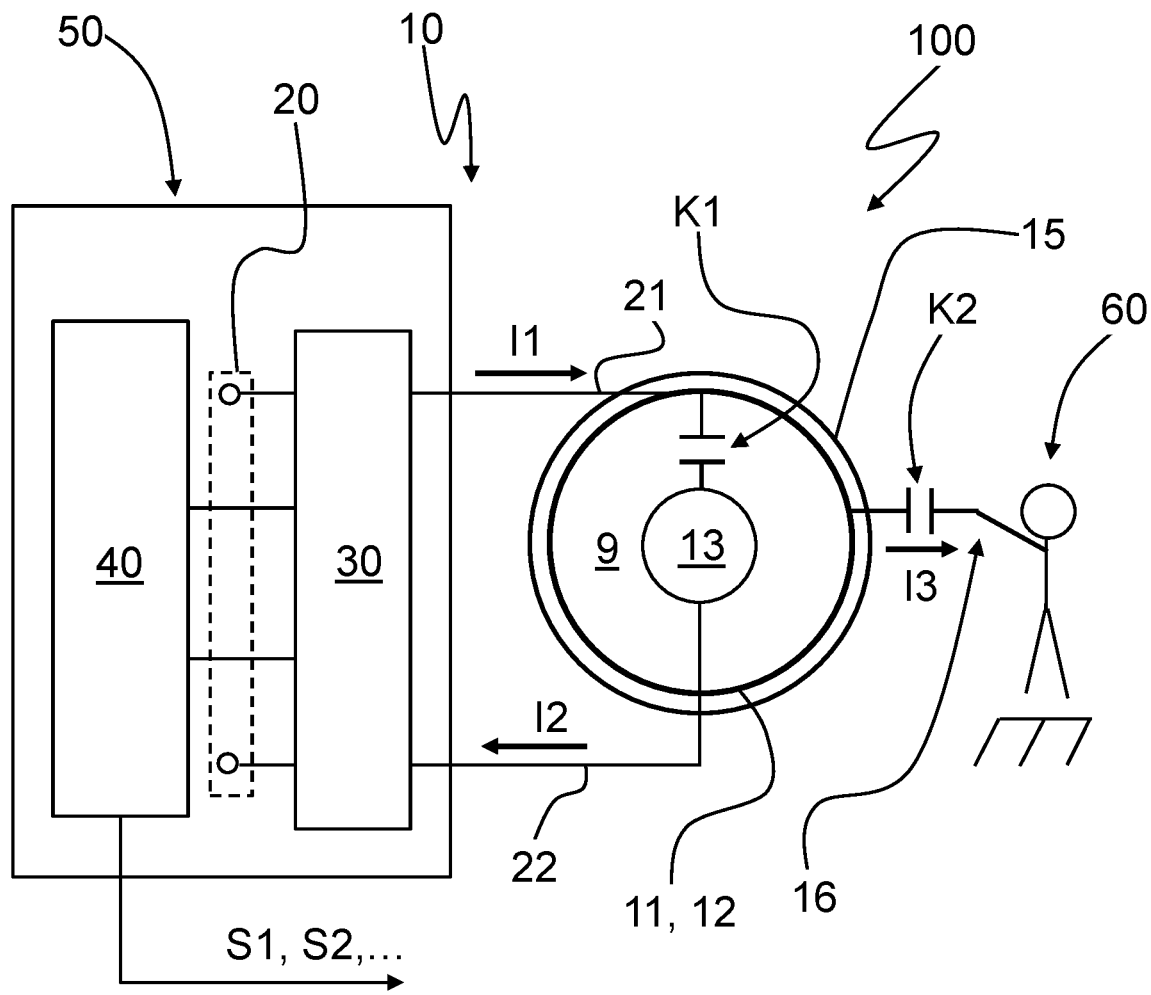
Figure 4:
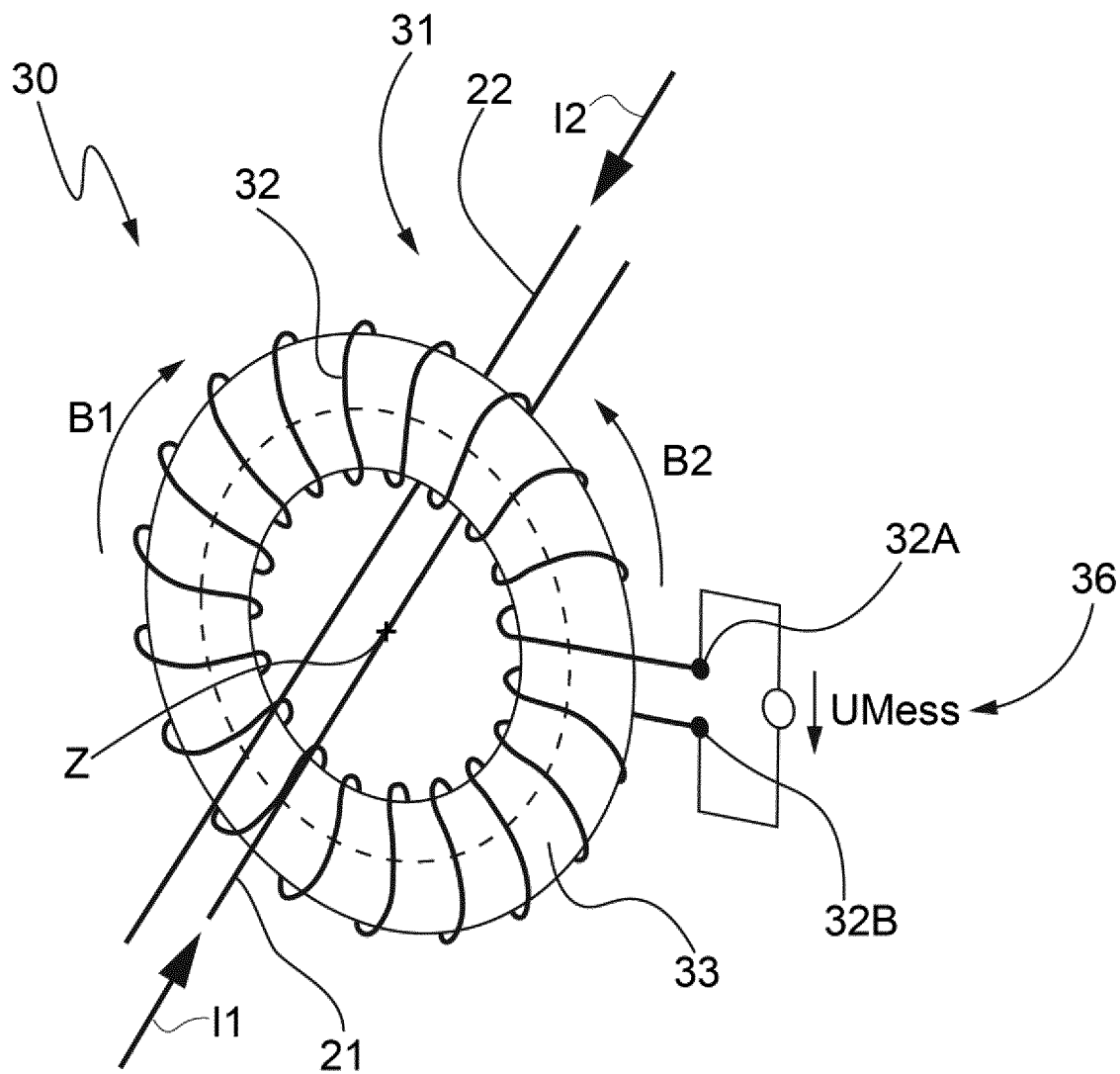
Figure 5:
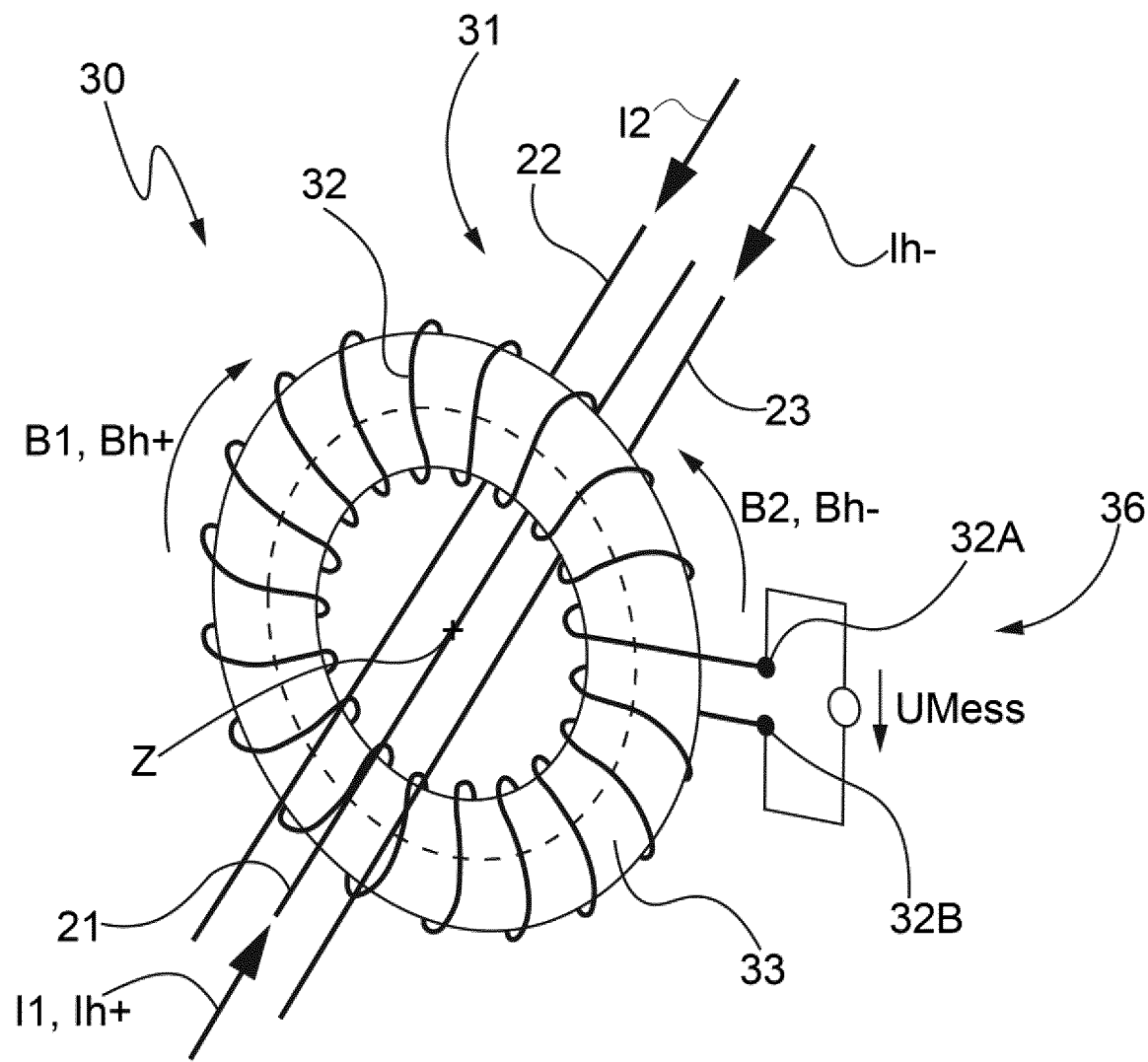
Figure 6:
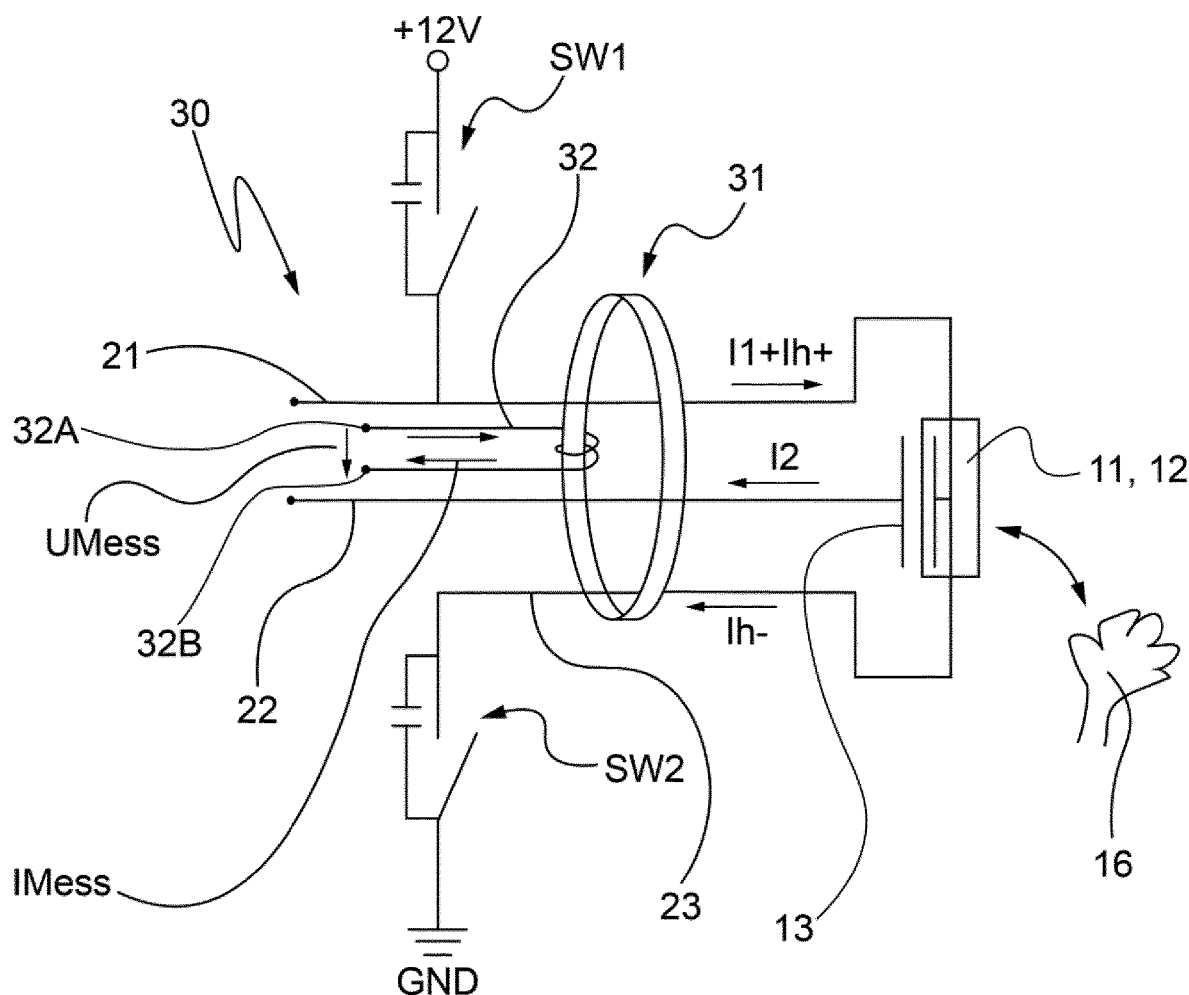
Figure 7A:
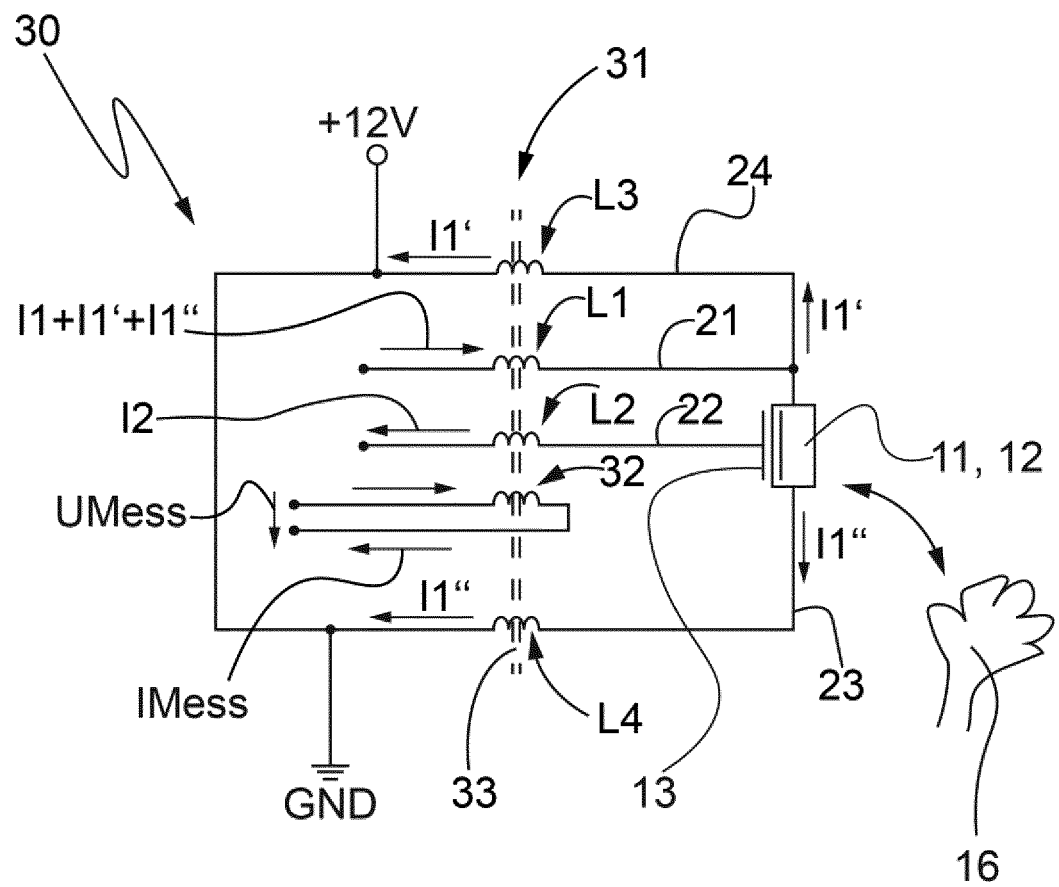
Figure 7B:
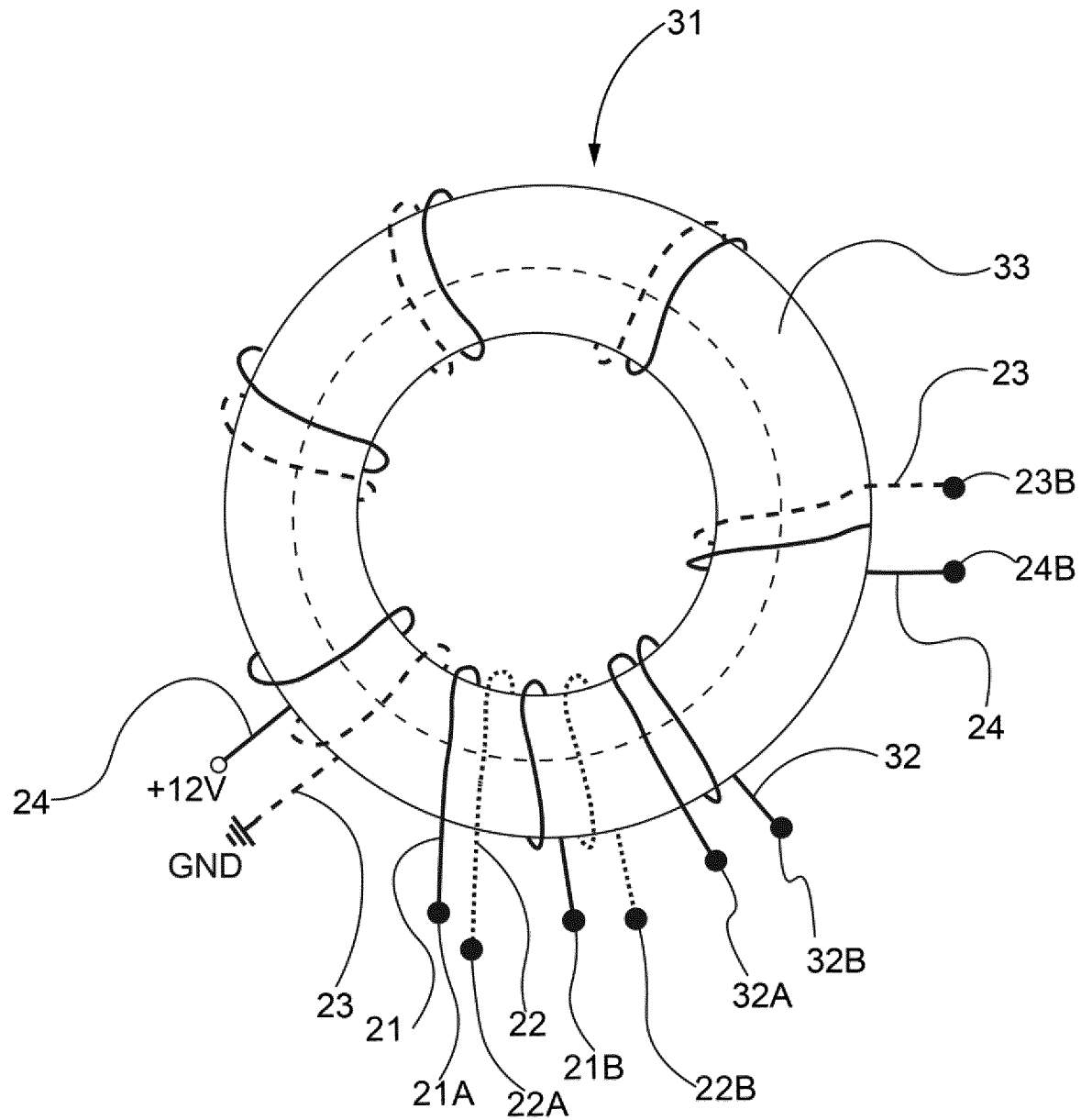
Figure 8:
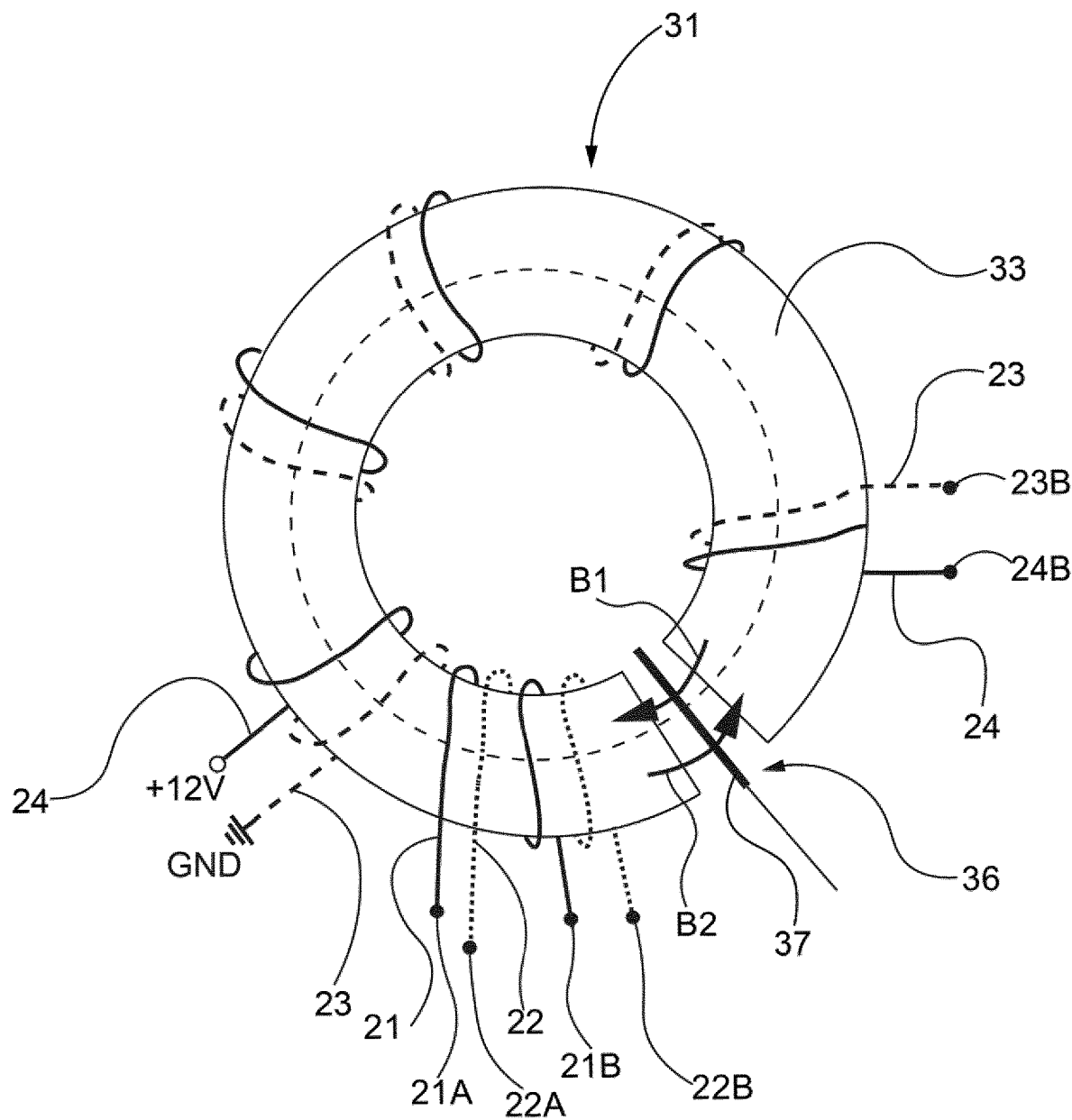

In the figures, schematically:

FIG. 1 shows a first exemplary embodiment of a steering wheel according to the invention from the point of view of a driver, FIG. 2 shows the steering wheel according to the invention from FIG. 1 with a sensor system according to the invention in a sectional illustration in the thickness direction, FIG. 3 shows a schematic block diagram of the sensor device according to the invention of the steering wheel from FIGS. 1 and 2, FIG. 4 shows, in a partly perspective and partly schematic illustration, a first exemplary embodiment of a measuring apparatus for the sensor device according to the invention from FIG. 3 or the steering wheel according to the invention from FIGS. 1 and 2, FIG. 5 shows a second exemplary embodiment of a measuring apparatus in a partly perspective and partly schematic illustration, FIG. 6 shows an exemplary block diagram concerning the measuring apparatus from FIG. 5, FIG. 7a shows a block diagram for a third exemplary embodiment of a measuring apparatus, FIG. 7b shows one exemplary embodiment of a coil for the measuring apparatus from FIG. 7a, and FIG. 8 shows a further exemplary embodiment of a coil for a measuring apparatus of a sensor device according to the invention.

FIG. 1 shows a first exemplary embodiment of a steering wheel 100 according to the invention for a vehicle from the point of view of a driver, and FIG. 2 shows a section through the steering wheel 100 from FIG. 1 in the thickness direction. FIG. 3 depicts an associated schematic block diagram of a first exemplary embodiment of the sensor device 10 according to the invention of the steering wheel 100 from FIGS. 1 and 2.

The exemplary embodiment of a steering wheel 100 according to the invention as illustrated in FIGS. 1 to 3 comprises a capacitive sensor device 10 according to the invention, which is designed for recognizing the presence of a human body part 16, in particular a hand or a finger 16, in a detection region of the sensor device 10, in particular for recognizing the presence of a human hand 16 in a gripping region 14 of the steering wheel 100.

The sensor device 10 comprises a first sensor electrode 11, which is formed by a heating electrode 12 of a heating structure, and also a second sensor electrode 13, which is formed by a metallic and electrically conductive steering wheel rim core 13. Alternatively, the second sensor electrode 13 can also be formed by a wire braiding in the steering wheel 100, which is preferably part of the heating structure.

In this case, the first sensor electrode 11 or the heating structure 12 extends both fully circumferentially in the enclosing direction 17 (cf. FIGS. 1 and 2) and fully circumferentially in the circumferential direction 18 (cf. FIG. 1), the circumferential direction 18 and the enclosing direction 17 being indicated by the reference arrows associated with the reference numerals 17 and 18.

In other words, in this exemplary embodiment, the first sensor electrode 11 and the heating structure 12 extend almost over an entire gripping region 14 of the steering wheel rim surface, the first sensor electrode 11 or the heating structure 12 being arranged almost directly below a covering 15, in particular beneath a steering wheel cover 15, for example a leather cover 15. In this case, the sensor electrode 11 and the heating structure 12 are embroidered on a support (not designated more specifically here) composed of a thin material, as is generally known from the prior art.

The metallic steering wheel rim core 13 arranged in the core region of the steering wheel rim forms the support structure of the steering wheel 100. A dielectric 9 is situated in a radial direction outside the steering wheel rim core 13, i.e. in the region of the outer side of the steering wheel rim core 13, by means of which dielectric the first sensor electrode 11 and the second sensor electrode 13 or the steering wheel rim core 13 are separated from one another and form a first capacitive element K1 (see FIG. 3). Furthermore, the first sensor electrode 11, together with the surroundings, forms a second capacitive element K2 (see FIG. 3).

In this case, recognizing that a human hand is approaching and/or moving away, said hand being symbolized by a fingertip 16 in FIG. 2, by means of the capacitive sensor device 10 is effected according to the so-called "capacitive principle", which is based on the fact that the presence of a human body part 16, for example a hand or a finger 16, in the detection region of the sensor device 10, in particular of the first sensor electrode 11, and also the circumstance of a human hand 16 approaching and/or moving away from the sensor electrode 11 bring about a change in the capacitive coupling of the sensor electrode 11 to the surroundings, which in turn influences the capacitive coupling between the first sensor electrode 11 and the second sensor electrode 13 or the steering wheel rim core 13, which can be captured metrologically.

The change in this capacitive coupling of the first sensor electrode 11 to the surroundings as a result of a human body part 16, for example a finger 16, is symbolized here in FIG. 2 by the field line-like lines between the dots on the sensor electrode 11. The presence of a human hand or a finger 16 in the detection region or the circumstance of a hand approaching and/or moving away can then be deduced from the captured change in the capacitive coupling of the sensor electrode 11 to the second sensor electrode 13.

For metrologically capturing the change in the capacitive coupling between the first sensor electrode 11 and the second sensor electrode 13, i.e. for capturing the change in the capacitance of the first capacitive element K1, which change arises when a human body part, for example a finger 16 of a hand of a driver 60, is present in the detection region of the sensor device 10, a sensor device 10 according to the invention furthermore comprises a current generating apparatus 20, by means of which a reference current I1 can be applied to the first sensor electrode 11 via a first electrode section 21, which is an electrical line 21, the current generating apparatus 20 comprising at least one AC current source and being designed to apply to the pair of first and second sensor electrodes 11, 13 a corresponding AC voltage, for example having a potential difference of 5 volts, such that an AC current I1 as reference current I1 can be applied to the first sensor electrode 11. In this case, the AC current I1 can also be superposed on a DC current, for example from a heating current Ih+, Ih−, and can thus be only an AC current component I1.

If no human body part 16 is situated in the detection region of the sensor device 10, the reference current I1, i.e. the AC current I1 or the AC current component I1, flows almost completely via the first capacitive element K1 into the steering wheel rim core 13 and away from there via the electrode section 22 of the second sensor electrode 13, said electrode section likewise being an electrical line 22, which in particular constitutes the sole electrical contacting of the second sensor electrode 13 or of the steering wheel rim core 13, as measurement current I2, for example in the direction of ground, that is to say that I2≈I1 holds true.

By contrast, if a human body part 16 is situated in the detection region of the sensor device 10, a portion of the reference current I1, in particular a so-called fault current component I3, flows away via the second capacitive element, in particular in the direction of ground. Consequently, only a small portion of the reference current I1 flows via the first capacitive element K1 into the steering wheel rim core 13 and away from there via the electrode section 22. That is to say that I2≈I1−I3 holds true in this case.

Consequently, in the case of a sensor device 10 according to the invention, by means of determining a current difference between the reference current I1 flowing into the first sensor electrode 11 and the measurement current I2 flowing away from the second sensor electrode I2 or the steering wheel rim core 13, i.e. by means of I1−I2 or I2−I1, or by means of determining a measurement variable dependent on the current difference I1−I2 or I2−I1 in the electrode sections 21 and 22, it is possible to recognize whether or not a human body part 16 is situated in the detection region of the sensor device 10.

For capturing the measurement variable, which can be in principle an electrical voltage UMess, an electrical current IMess and/or a magnetic flux BMess=B1−B2 or BMess=B2−B1 (cf. FIGS. 4 to 8), the sensor device 10 comprises according to the invention a corresponding measuring apparatus 30, the measuring apparatus 30 comprising an electrical coil 31 for this purpose, which will be explained in even greater detail below, in particular with reference to FIGS. 4 to 8.

Furthermore, an evaluation apparatus 40 is provided, which together with the current generating apparatus 20 and the measuring apparatus 30 is part of a control apparatus 50, which comprises in particular at least one IC, in particular at least one ASIC. In this exemplary embodiment of a sensor device 10 according to the invention, the evaluation apparatus 40 here is configured, depending on the determined measurement variable, in particular in conjunction with temporally preceding captured measurement values, to specify whether there is in each case an approach or touching or a positionally invariable presence of the human body part 16 in the detection region of the sensor device 10.

The sensor device 10 is designed here in such a manner that the measurement variable is in each case proportional to the distance between a human body part 16 and the at least one first sensor electrode 11 or the gripping area 14 of the steering wheel 100. In particular, the evaluation apparatus 40 is configured, depending on the determined measurement variable or the value thereof, to ascertain a distance between a human body part 16 and the at least one first sensor electrode 11 or the gripping area 14 of the steering wheel 100.

Furthermore, the evaluation apparatus 40 is configured to computationally extract a disturbing variable arising as a result of a parasitic capacitance and a disturbing variable based on a temperature-dictated systematic deviation, the parasitic capacitance being small in relation to a change in capacitance in the event of the presence of, in particular an approach and/or touching by, a human body part 16 in the detection region of the sensor device 10. A temperature-dictated systematic deviation can be attained for example by means of a comparison of a present measurement variable value with temporally preceding captured measurement variable values. Parasitic capacitances in the steering wheel 100 can be computationally extracted for example with compensation variables ascertained and stored for the respective steering wheel construction 100.

Furthermore, this example of a sensor device 10 according to the invention is configured to output a plurality of sensor signals S1, S2, . . . each containing signal information that characterizes the presence of a human body part 16 in the detection region of the sensor device, for example whether or not a human body part 16 is situated in the detection region of the sensor device, and if there is, where in the detection region and at what distance from the gripping area 14. This makes it possible to realize particularly advantageous and comprehensive functions, for example comprehensive driver assistance functions.

FIG. 4 shows, in a partly perspective and partly schematic illustration, a first exemplary embodiment of a measuring apparatus 30 for the sensor device 10 according to the invention from FIG. 3 or the steering wheel 100 according to the invention from FIGS. 1 and 2. The measuring apparatus 30 comprises according to the invention a coil 31, which in this exemplary embodiment is designed as a closed annular coil 31 (toroidal coil) having a permanent-magnetic, ferromagnetic coil core 33, an electrical conductor 32 being wound around the coil core 33. The electrical conductor 32 forms a, and in this case the sole, winding 32 of the coil 31, the winding 32 comprising seventeen complete turns and serving as a measurement winding 32.

In this case, the first electrode section 21 or the electrical connection line 21 and the second electrode section 22 or the electrical connection line 22 are designed in such a manner and arranged relative to one another and relative to the coil 31 in such a manner that a current I1 flowing in the first electrode section 21 and a current I2 flowing in the second electrode section 22 flow in opposite directions at least in the region of the coil 31 and generate in each case oppositely directed magnetic fluxes B1 and B2 in the coil 31, which is symbolized by the corresponding arrows.

In this case, the two electrode sections 21 and 22 are arranged in particular in such a manner that in a reference state of the coil 31, i.e. when no finger 16 or the like is situated in the detection region of the sensor device 10, the current I1 flowing in the first electrode section 21 and the current I2 flowing in the second electrode section 22, at least in a region of influence on the coil 31, cancel one another out and the oppositely directed magnetic fluxes B1 and B2 generated by them in each case in the coil 31 cancel one another out.

In the case of this coil 31 or in the case of this measuring arrangement for a sensor device 10 according to the invention, the first electrode section 21 and the second electrode section 22 are situated at least partly within the coil 31, the two electrode sections 21 and 22 being guided through the interior of the coil 31 and running parallel to a center axis (not illustrated) running through the geometric center Z of the coil.

In this case, the coil 31 is designed in such a manner that the measurement variable that is dependent on the current difference and is generated in the coil 31 is an electrical voltage UMess generated in the winding 32. For capturing this voltage UMess, the measuring apparatus 30 comprises a corresponding voltage measuring unit 36.

If a current I1 or I2 flows through the respective electrode section 21 or 22, a magnetic flux B1 and a magnetic flux B2 are generated in the core 33 of the coil 31, and act in opposite directions in this case, only a difference flux B1−B2 or B2−B1 being left if a current difference I1−I2 or I2−I1 is present. Otherwise, the magnetic fluxes B1 and B2 cancel one another out. The magnetic difference flux has the effect that in the winding 32 a current flow or an electrical current IMess is generated (cf. FIG. 6) which leads to a voltage drop across the winding 32, which voltage drop is proportional to the difference flux and thus also to the current difference and can be measured as voltage UMess via the connection contacts 32A and 32B by means of a current measuring unit 36.

FIG. 5 shows a second exemplary embodiment of a measuring apparatus 30 having a coil 31, with respect to which a corresponding block diagram is illustrated in FIG.

6, this measuring apparatus 30 in principle being constructed like the measuring apparatus 30 illustrated in FIG. 4 and operating according to the same functional principle. Functionally identical component parts are therefore provided in each case with the same or identical reference signs.

In contrast to the measuring apparatus 30 illustrated in FIG. 4, alongside the two electrode sections 21 and 22 in each case the connection section 23 of the heating electrode 12, said connection section returning a current Ih− from the heating electrode 12, is also guided through the coil 31 in order to compensate for a fault current component or a heating current component Ih+ or respectively Ih− flowing away via this connection section 23. With such an arrangement, the sensor device 10 according to the invention from FIG. 4 can be integrated particularly easily in a steering wheel 100 according to the invention with a heating apparatus 12, in particular in a steering wheel 100 in which the first sensor electrode 11 and the heating electrode 12 are formed as in the present case by a common electrode 11, 12. For heating purposes, a 12 V DC current can be applied to the heating electrode 12 with the aid of corresponding switches SW1 and SW2.

In this example, the first electrode section 21 of the first sensor electrode 11 and the first connection heating electrode section, at least in sections, are formed jointly, i.e. by one and the same electrical conductor section 21. However, the connection heating electrode section 23 returning a current Ih− from the heating electrode 12 is formed separately and is arranged relative to the outgoing connection heating electrode section 21 and relative to the coil 31 and is coupled to the coil 31 in such a manner that the currents Ih+ and Ih− flowing into the connection heating electrode sections 21 and 23 or the magnetic fluxes Bh+ and Bh− resulting from said currents are likewise compensated for. This makes it possible to compensate for deviations caused by the heating electrode 12, in particular.

In addition to a voltage measurement of the voltage UMess, in this exemplary embodiment, a measurement current IMess flowing in the measurement winding 32 can furthermore also be captured as measurement variable, as a result of which a plausibilization of the measurement variable becomes possible, the measuring apparatus 30 additionally comprising a current measuring unit (not illustrated here) for this purpose.

FIG. 7a shows a block diagram for a fourth exemplary embodiment of a measuring apparatus 30 and FIG. 7b shows one possible exemplary embodiment of a coil 31 for such a measuring apparatus 30, in this case neither of the electrode sections 21 and 22 being guided as normal conductors through the coil, but rather each being designed as further windings, i.e. in addition to measurement winding 32, each having an associated inductance L1 and L2, respectively. Likewise, the connection heating electrode sections 24 (outgoing) and 23 (return) are designed in each case separately and in each case as separate windings having inductances L3 and L4, the individual windings of the coil 31 being coupled to one another via the common coil core 33.

Via the connection nodes 23B and 24B, the connection heating electrode sections 23 and 24 can each be electrically connected to the respective heating electrode region 12 in the steering wheel 100. Likewise, the first electrode section 21 and the second electrode section 22 can each be electrically connected to the respectively associated sensor electrode 11 and 13, respectively, at the steering wheel via the "B" connection node 21B and 22B, respectively. Via the "A" connection node 21A, a reference current I1 can be applied to the first electrode section 21, and can flow away via the connection node 22A of the second electrode section 22 as measurement current I2 toward ground (GND).

Via the connection nodes 32A and 32B of the measurement winding 32, a measurement voltage UMess dropped across the measurement winding and/or a measurement current IMess flowing in the measurement winding 32 can be captured or measured.

This measuring apparatus 30 functions according to the same principle: a current difference I1−I2 or I2−I1 produced from the currents I1 and I2 flowing in the electrode sections 21 and 22 leads to a magnetic difference flux B1−B2 or B2−B1 in the core 33, resulting in the generation of an electrical voltage UMess dependent on the current difference and/or an electrical current IMess dependent on the current difference in the measurement winding 32, which can be measured as measurement variable by means of a corresponding measuring unit 36.

By virtue of the design of the connection heating electrode sections 24 and 23 likewise as further windings of the coil 31, which are correspondingly arranged with actions in opposite directions, the reference current components I1' and I1" flowing away via the connection heating electrode sections 24 and 23 are also compensated for, such that the capturable measurement variable is virtually only dependent on the capacitive coupling between the surroundings and the first sensor electrode 11.

Furthermore, the heating currents Ih+, Ih− flowing in the connection sections 23 and 24 also each cancel one another out. As a result, this measuring apparatus 30 furthermore has the advantage that it furthermore enables simultaneous heating and measurement, which is intended to be expressed by the closed switches SW1 and SW2 (cf. FIG. 6), which are not illustrated in FIG. 7a. This is achieved in particular by means of the separate configuration of the individual connection sections 21, 22, 23 and 24 and the arrangement thereof in each case relative to one another and relative to the coil 31 and relative to the core 33.

However, simultaneous measurement and heating presupposes a correspondingly suitable coordination of the individual inductances L1 to L4, since the magnetic flux generated by the heating current in the coil core 33 otherwise becomes too strong and dominant and, consequently, a reasonably usable or evaluable measurement signal for the measurement variable does not arise. Here a ratio of L1≈L2≈L(32) and L3≈L4 has proved worthwhile, in particular where L3:L1≈60, in particular L3:L1=60, in which case L1, L2 and L(32) can be for example 10 µH, and L3 and L4 for example 600 µH. Alternatively, a ratio L3:L1≈100 or 500 would also be possible.

FIG. 8 shows a further exemplary embodiment of a coil 31 for a measuring apparatus 30 of a sensor device 10 according to the invention, in this case the measurement variable that is dependent on the current difference and is generable in the coil 31 being a magnetic flux flowing in the coil 31 or the core 33 thereof, in particular a magnetic difference flux B1−B2 or B2−B1, and the measuring apparatus 30 comprising a magnetic flux measuring unit 36, which in this case comprises a Hall sensor 37 for measuring said magnetic difference flux.

According to the invention, this coil 31 likewise comprises at least one winding, specifically a first winding 21, a second winding 22 and a magnetic or magnetizable core 33, the first winding 21 being formed by the first electrode section 21, and the second winding 22 being formed by the second electrode section 22. Furthermore, in each case two heating windings 23 and 24 acting in opposite directions are provided as well. A measurement winding is not necessary, however. This makes possible a particularly simple construction of the measuring apparatus 30 requiring particularly few component parts.

A particularly simple configuration can be achieved for example with an annular coil 31, as shown in FIG. 8, with a ring-shaped, but not completely closed, magnetic ring core 33 having a small air gap between its ring ends, the Hall sensor element 37 projecting into said air gap in order to capture a resulting magnetic difference flux B1–B2 or B2–B1 flowing through the gap in the circumferential direction.

In the advantageous implementation of a method according to the invention for operating the sensor device 10 according to the invention and/or the steering wheel 100 according to the invention, in particular for recognizing the presence of a human body part 16 in the detection region of the sensor device 10 and/or of the steering wheel 100, in particular for recognizing an approach and/or touching by a human hand 16, the following steps are carried out:

applying a reference current I1, which is an AC current, to the first sensor electrode 11 by means of the current generating apparatus 20, and capturing, in particular measuring, a measurement variable that is dependent on a current difference between the reference current I1 flowing in the first sensor electrode 11 and the measurement current I2 flowing in the second sensor electrode 13 and is generated in the coil 31, in particular by means of the measuring apparatus 30, in which case the measurement variable can be in particular an electrical voltage UMess dropped across the at least one winding 32 of the coil 31, an electrical current IMess flowing through same, or a magnetic flux in the coil 31.

In a further step, in the case of the steering wheel 100, the determined measurement variable can be taken as a basis for checking whether a human body part 16 is situated in the detection region of the sensor device, in particular in the detection region of the first sensor electrode 11, a human body part 16 being situated in the detection region of the sensor device 10, in particular in the detection region of the associated first sensor electrode 11, if the determined measurement variable or a current difference I1–I2 or I2–I1 on which said determined measurement variable is based is in particular significantly different than zero, or an absolute value of the determined measurement variable exceeds a defined threshold value, and no human body part 16 being situated in the detection region if the determined measurement variable is almost zero or zero, i.e. if the reference current I1 and the measurement current I2 are equal within the scope of the measurement accuracy and the unavoidable losses, and/or an absolute value of the determined measurement variable lies below a defined threshold value.

In a further step, depending on the determined measurement variable, it is then possible to ascertain a characteristic variable of the presence of a human body part 16 in the detection region of the associated sensor electrode 11, for example a variable that characterizes an approach and/or touching, for example a distance or a touching position.

Furthermore, in the evaluation apparatus 40, a compensation variable can be ascertained and/or at least one determined characterizing variable can be computed with the at least one determined compensation variable for the purpose of the at least partial compensation of at least one disturbing variable.

Afterward, it is possible to generate and output preferably a plurality of sensor signals S1, S2, . . . each containing signal information characterizing the presence of a human body part 16 in the detection region of the sensor device, which can be used in other functions or systems, for example in a driver assistance system.

LIST OF REFERENCE SIGNS

10 Sensor device according to the invention
100 Steering wheel according to the invention
9 Dielectric
11 First sensor electrode
12 Heating electrode
13 Steering wheel rim core; second sensor electrode
14 Gripping region of the steering wheel
15 Steering wheel cover (steering wheel covering)
16 Finger of a human hand
17 Enclosing direction
18 Circumferential direction
20 Current generating apparatus
21, 22, Electrical line
23, 24
21A, 21B Connection node
22A, 22B
23A, 23B
24A, 24B
32A, 32B
30 Measuring apparatus
31 Coil
32 (Measurement) winding
33 Coil core
36 Measuring unit (voltage measuring unit, current measuring unit, magnetic measuring unit)
37 Hall sensor
40 Evaluation apparatus
50 Control apparatus
60 Driver
B1 Magnetic flux generated by reference current
B2 Magnetic flux generated by measurement current
Bh+ Magnetic flux generated by current in the direction of heating electrode
Bh− Magnetic flux generated by current return flow from heating electrode
GND Ground potential (ground)
I1 Reference current
I1', I1" Reference current component
I2 Measurement current
I3 Fault current
Ih+ Current in the direction of heating electrode
Ih− Current return flow from heating electrode
IMess Measurement current
K1 First capacitive element
K2 Second capacitive element
L1 Winding with inductance
L2 Winding with inductance
L3 Winding with inductance
L4 Winding with inductance
S1, S2 Control signal
SW1, SW2 Switch
UMess Measurement voltage
Z Center of the coil

The invention claimed is:

1. A capacitive sensor device for recognizing the presence of a human body part in a detection region of the sensor device for recognizing the presence of a human hand in a gripping region of a steering wheel, the sensor device comprising:

at least one first sensor electrode having an associated detection region and a first electrode section and a second sensor electrode having a second electrode section, the at least one first sensor electrode and the second sensor electrode being separated from one another by a dielectric between them, forming a first capacitive element, and the at least one first sensor electrode together with its surroundings further forming a second capacitive element;

a measuring apparatus configured to determine a measurement variable dependent on a current difference between a first current flowing in the first electrode section of the at least one first sensor electrode and a second current flowing in the second electrode section of the second sensor electrode, wherein the measuring apparatus comprises an electrical coil having at least one winding, the electrical coil being arranged so that, and the first electrode section of the first sensor electrode and the second electrode section of the second sensor electrode, at least in sections, being arranged in each case relative to one another and in each case relative to the coil in such a manner and being coupled to the coil, so that a measurement variable dependent on a current difference between a first current flowing in the first electrode section and a second current flowing in the second electrode section is generated in the coil by the current difference.

2. The sensor device as claimed in claim 1, further comprising an evaluation apparatus configured to recognize the presence of a human body part in the detection region of the sensor device depending on the determined measurement variable.

3. The sensor device as claimed in claim 1, further comprising: a current generating apparatus, at least one of the two sensor electrodes being electrically connectable or connected to the current generating apparatus and being able to have a reference current applied thereto by the current generating apparatus, the current generating apparatus being an AC current generating apparatus.

4. The sensor device as claimed in claim 1, wherein the measuring apparatus is configured to determine a measurement variable dependent on a current difference between a current flowing in the sensor electrode to which the reference current is applied and a measurement current flowing in the other sensor electrode.

5. The sensor device as claimed in claim 1, wherein the first electrode section and the second electrode section are arranged relative to one another in such a manner that a current flowing in the first electrode section and a current flowing in the second electrode section flow in opposite directions at least in the region of the coil and/or generate in each case oppositely directed magnetic fluxes in the coil.

6. The sensor device as claimed in claim 1, wherein the measurement variable that is dependent on the current difference and is generable or generated in the coil is an electrical voltage, and the measuring apparatus comprises a voltage measuring unit for measuring said electrical voltage.

7. The sensor device as claimed in claim 6, wherein the first electrode section and/or the second electrode section are/is situated at least partly within the coil.

8. The sensor device as claimed in claim 1, wherein the measurement variable that is dependent on the current difference and is generated in the coil is an electrical current, and the measuring apparatus comprises a current measuring unit for measuring said electrical current.

9. The sensor device as claimed in claim 8, wherein the at least one winding of the coil is a measurement winding, and the first electrode section and the second electrode section each form a further winding of the coil.

10. The sensor device as claimed in claim 1, wherein the measurement variable that is dependent on the current difference and is generable of generated in the coil is a magnetic flux, and the measuring apparatus comprises a magnetic flux measuring unit (36; 37) for measuring said magnetic flux.

11. The sensor device as claimed in claim 10, wherein the coil comprises at least one first winding, a second winding and a magnetic or magnetizable core, the first winding being formed by the first electrode section, and the second winding being formed by the second electrode section.

12. A steering wheel comprising a capacitive sensor device, as claimed in claim 1.

13. The steering wheel as claimed in claim 12, further comprising:

at least one heating electrode, the at least one heating electrode comprising two connection heating electrode sections, and the two connection heating electrode sections being arranged in each case relative to one another and in each case relative to the coil in such a manner and being coupled to the coil in such a manner that a heating current flowing in the first connection heating electrode section and a heating current flowing in the second connection heating electrode section flow in opposite directions at least in the region of the coil and/or generate in each case oppositely directed magnetic fluxes, such that an influence, resulting from the heating current, on the measurement variable that is generated in the coil depending on the current difference in the electrode sections of the sensor electrodes is reduced or avoided.

14. A vehicle comprising a steering wheel as claimed in claim 12.

15. A method for operating a sensor device as claimed in claim 1, comprising:

providing the sensor device; and determining, with the aid of the coil of the measuring apparatus of the sensor device, a measurement variable dependent on a current difference between a first current flowing in the first electrode section of the at least one first sensor electrode and a second current flowing in the second electrode section of the second sensor electrode.

16. The method as claimed in claim 15 for operating a steering wheel comprising a heating apparatus, wherein determining the measurement variable dependent on a current difference between a first current flowing in the first electrode section of the at least one first sensor electrode and a second current flowing in the second electrode section of the second sensor electrode is effected during the operation of the heating apparatus, while a heating current is applied to the heating electrode.

* * * * *